Feb. 27, 1968    W. C. TAYLOR    3,370,394
PACKAGING APPARATUS AND METHOD OF PACKAGING
Filed Jan. 7, 1966    15 Sheets-Sheet 1

INVENTOR.
WESLEY C. TAYLOR
BY
MAHONEY, MILLER & RAMBO
BY
ATTORNEYS

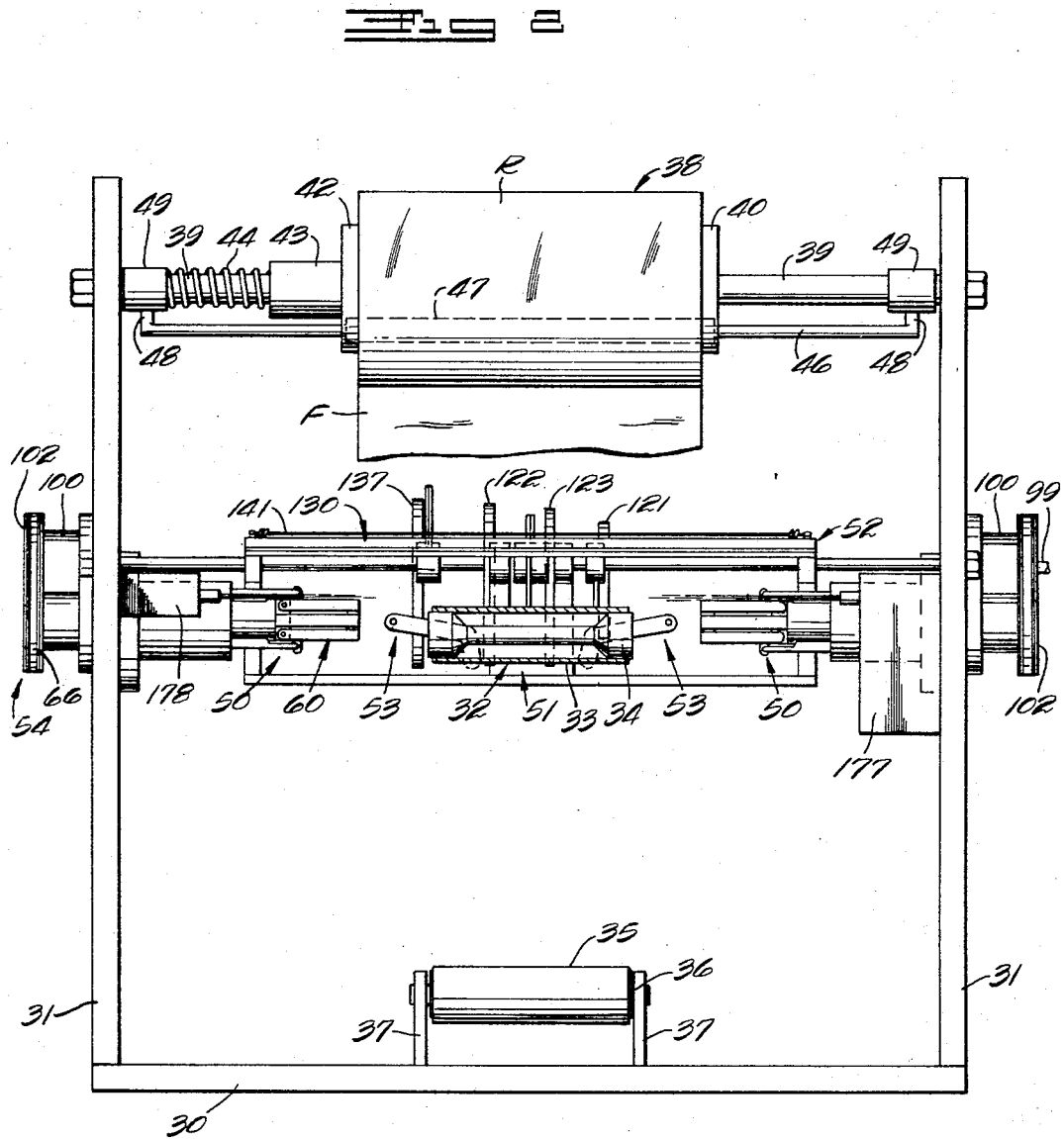

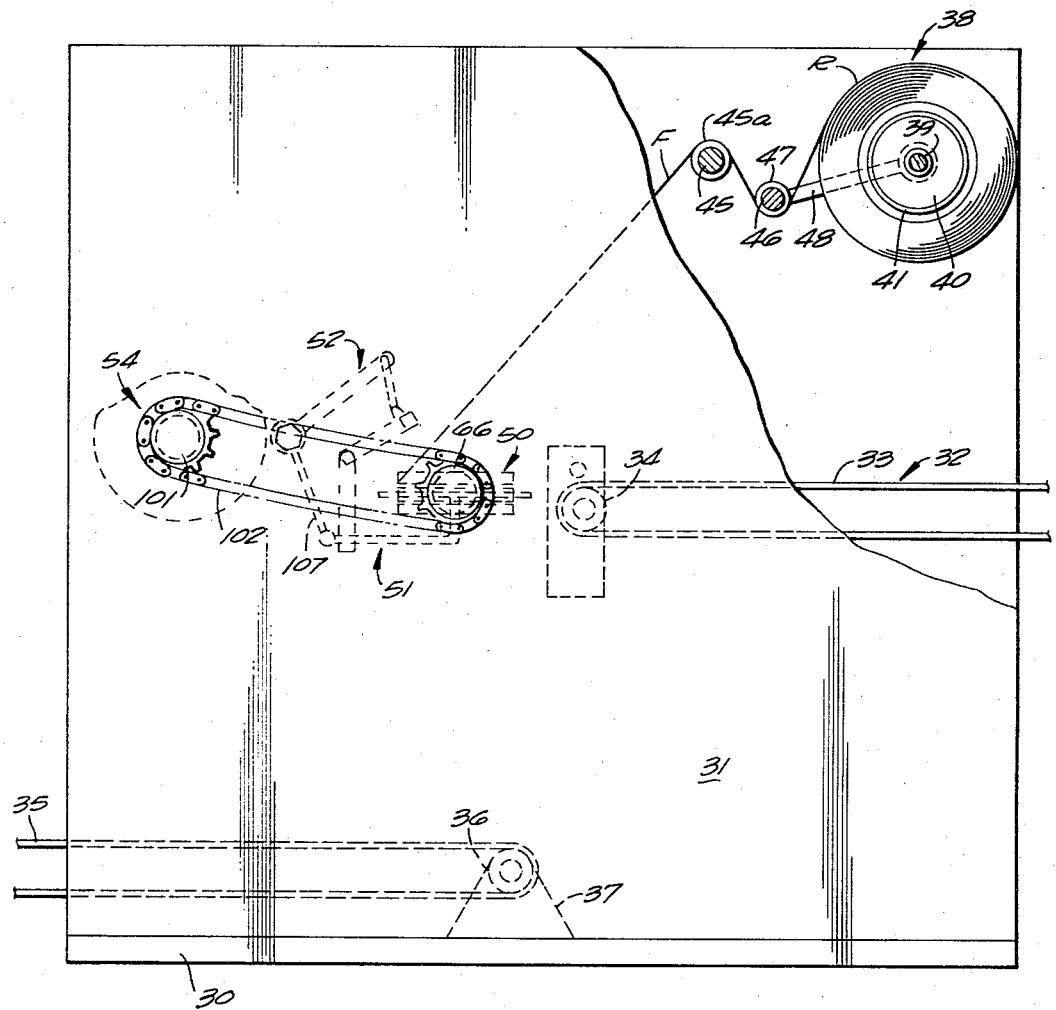

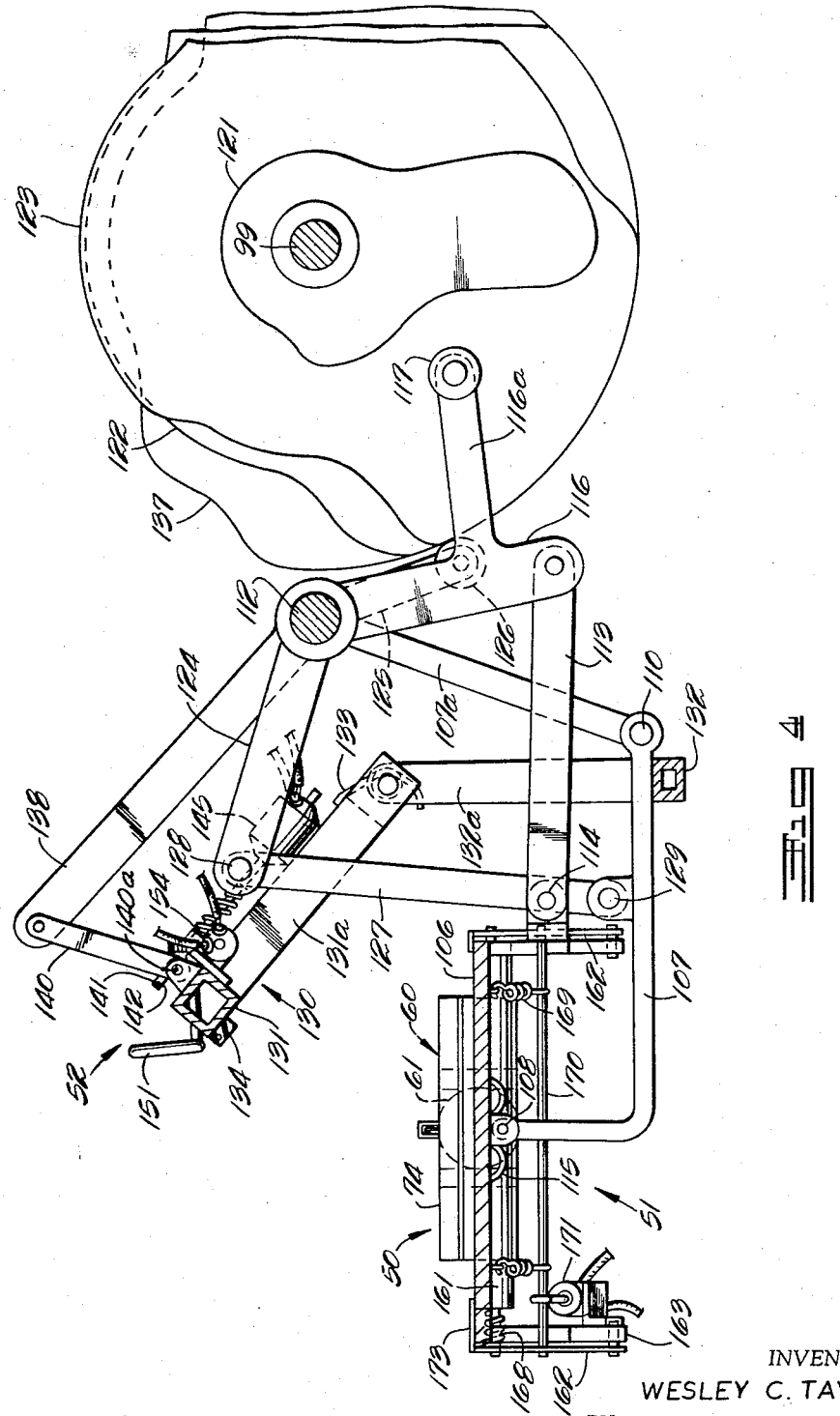

Feb. 27, 1968 W. C. TAYLOR 3,370,394
PACKAGING APPARATUS AND METHOD OF PACKAGING
Filed Jan. 7, 1966 15 Sheets-Sheet 5
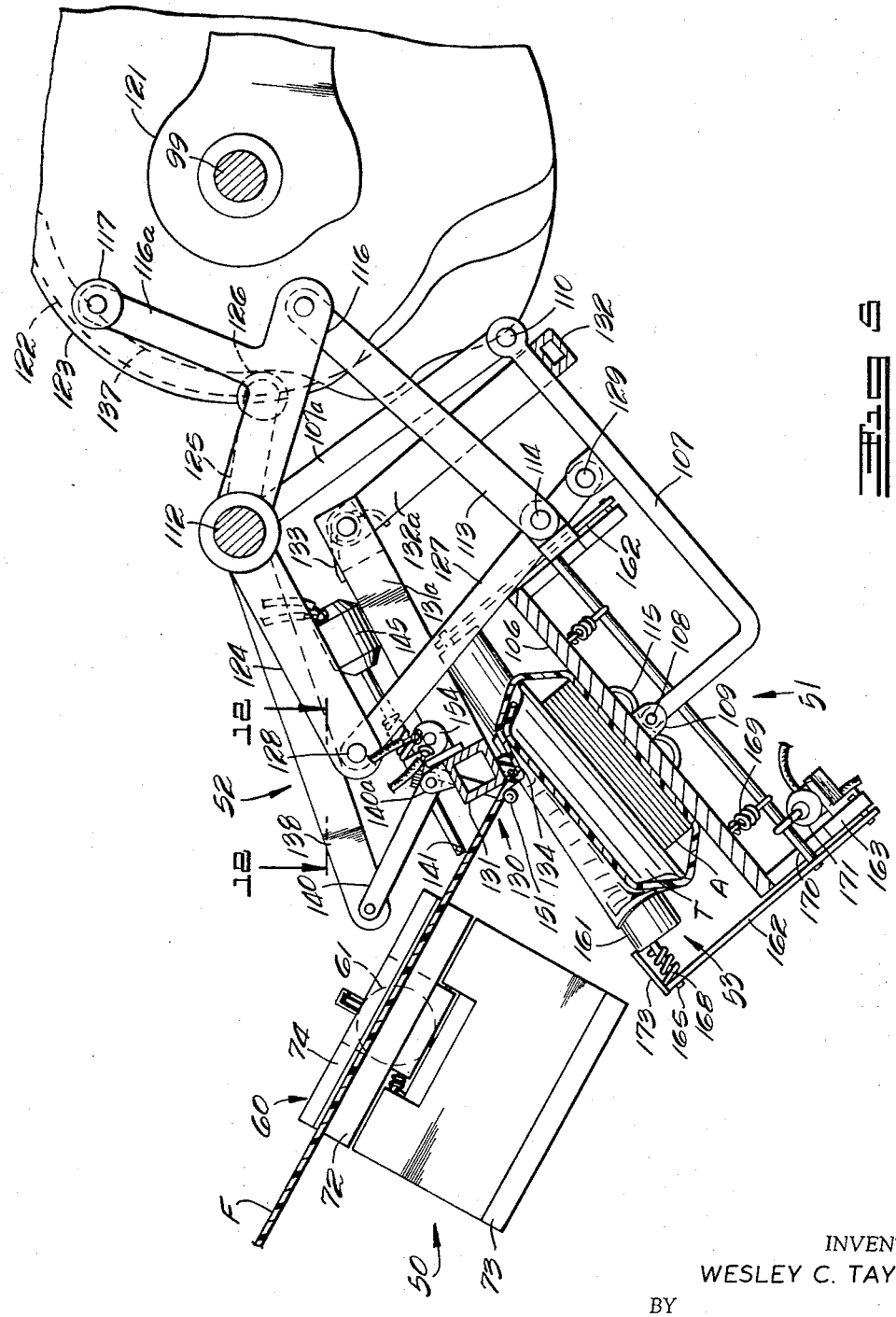
INVENTOR.
WESLEY C. TAYLOR
BY MAHONEY, MILLER & RAMBO
BY *Wm. V. Miller*
ATTORNEYS

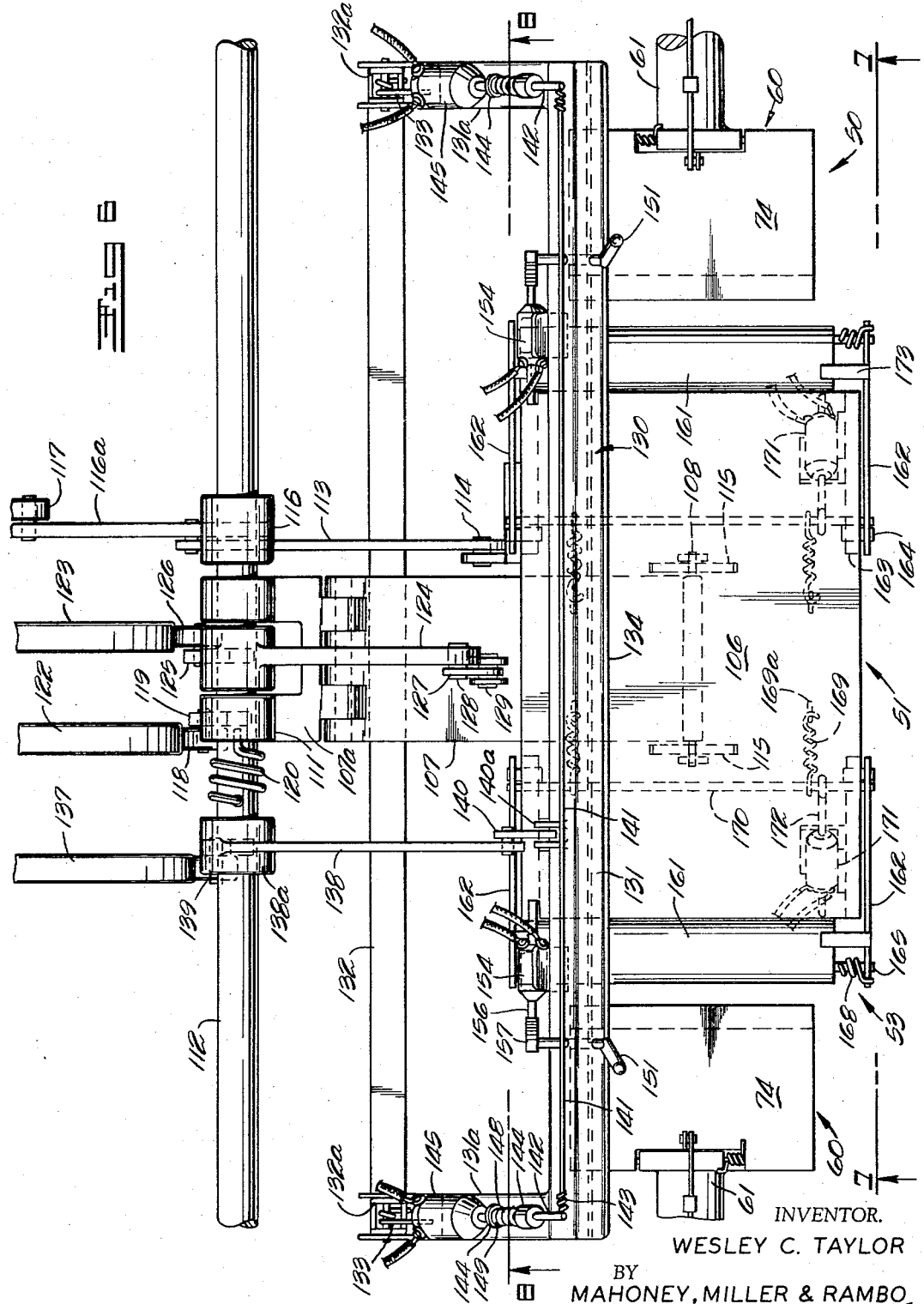

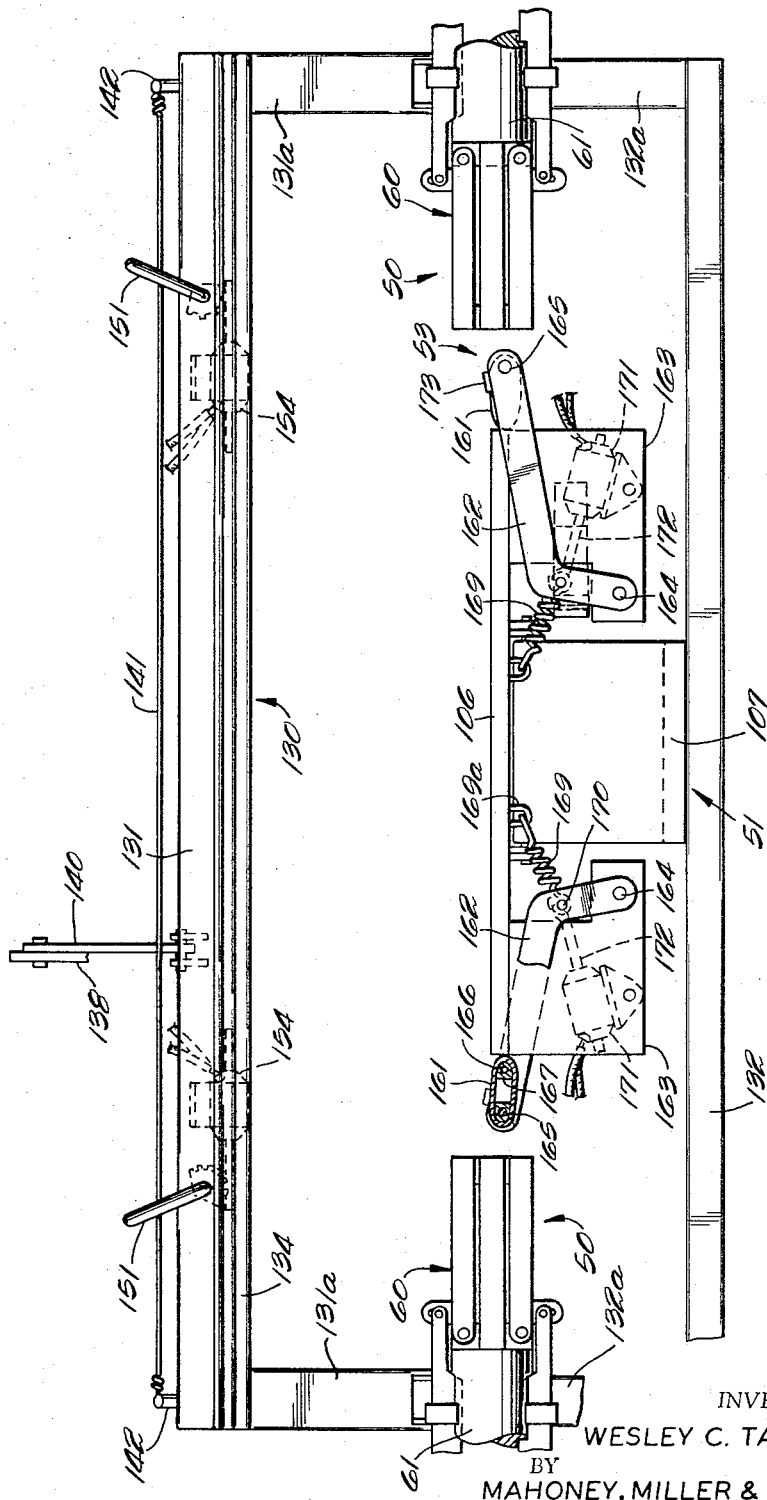

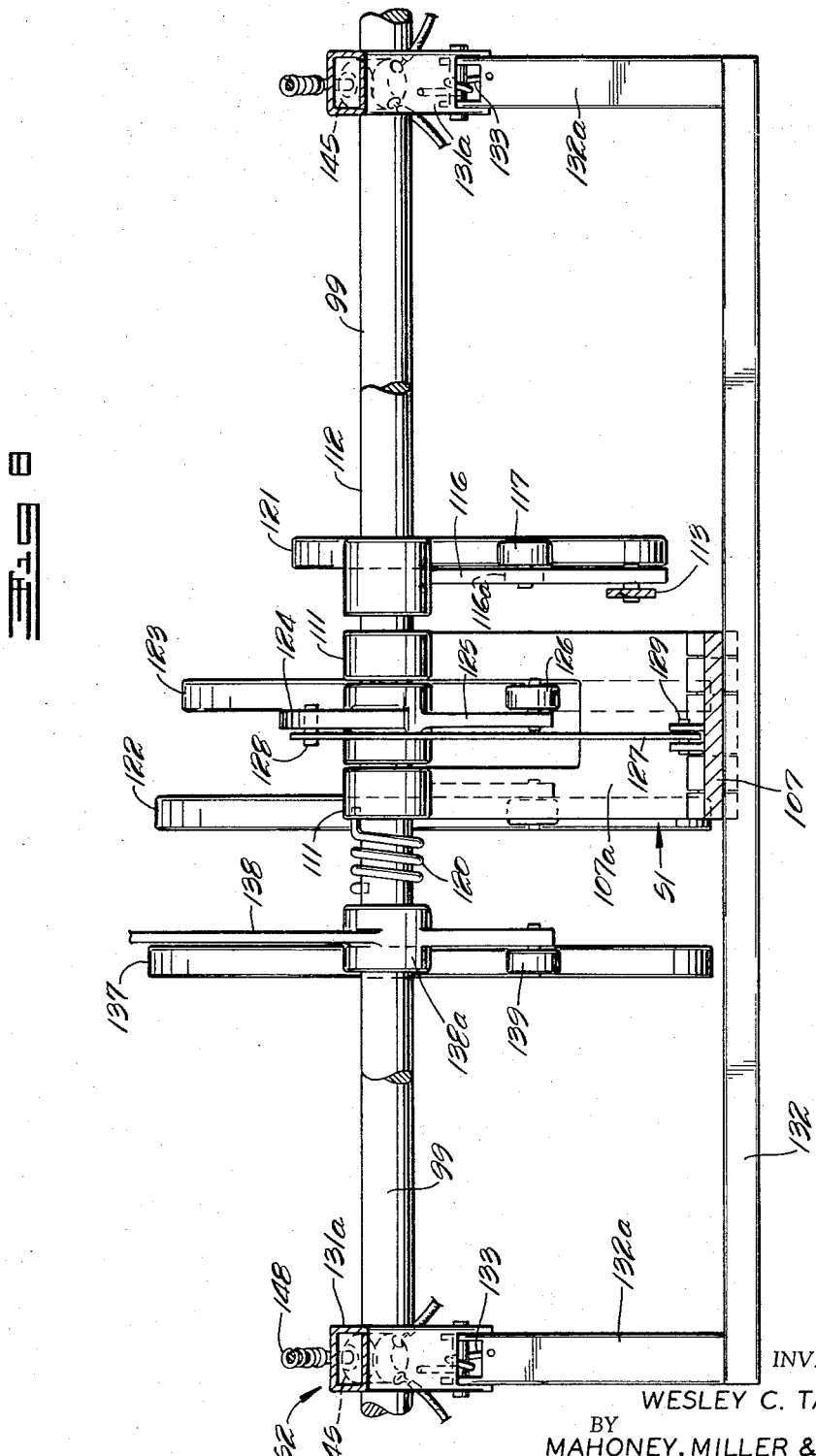

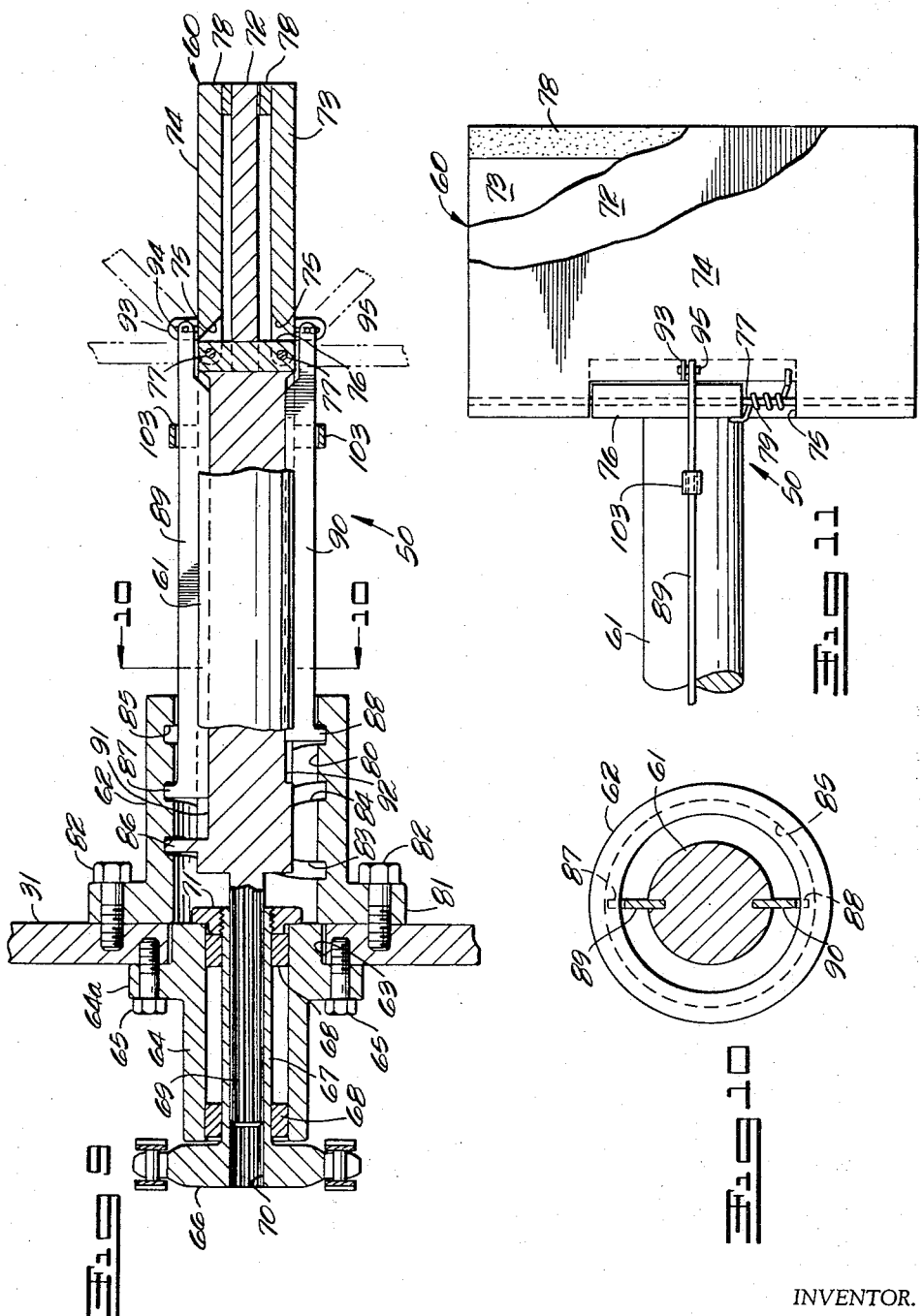

INVENTOR.
WESLEY C. TAYLOR
BY
MAHONEY, MILLER & RAMBO
ATTORNEYS

INVENTOR.
WESLEY C. TAYLOR
BY
MAHONEY, MILLER & RAMBO
BY Wm. V. Miller
ATTORNEYS

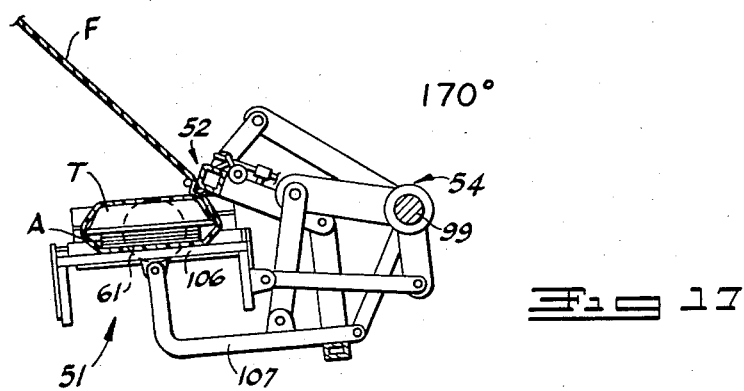
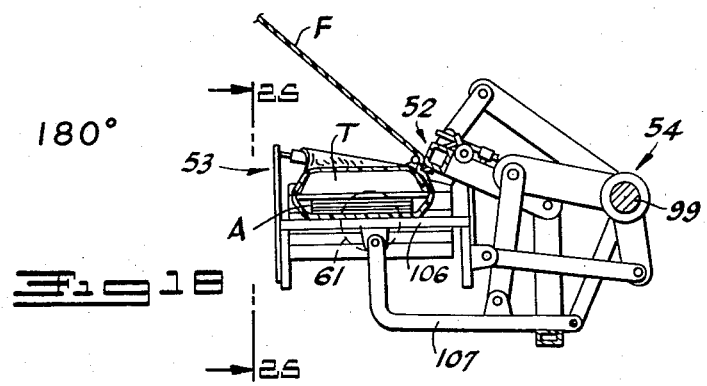
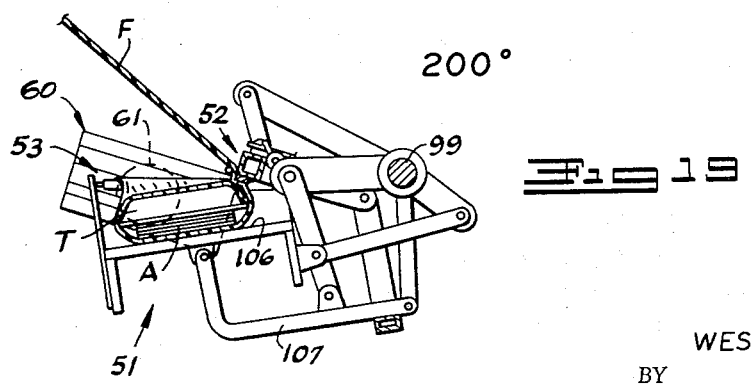

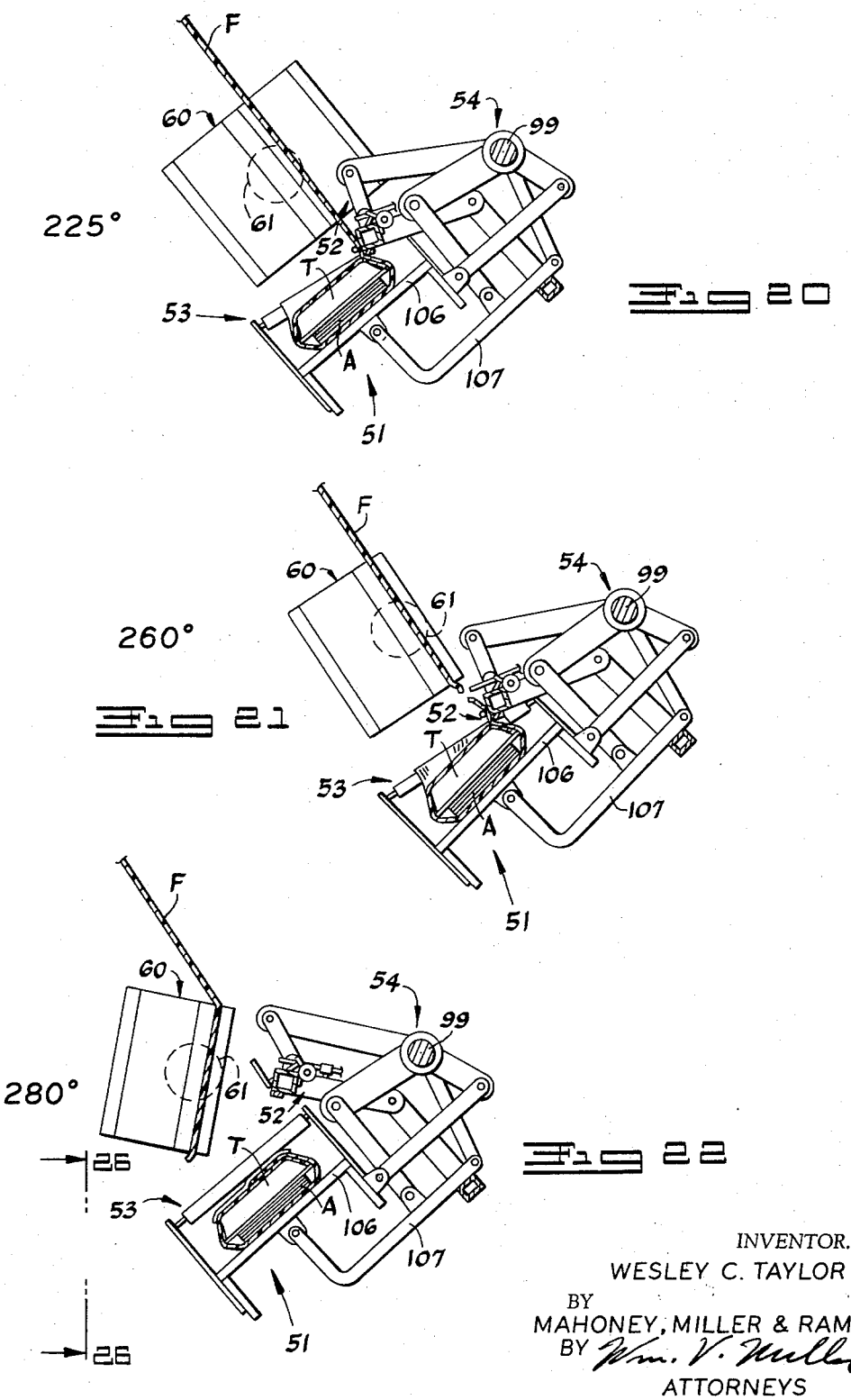

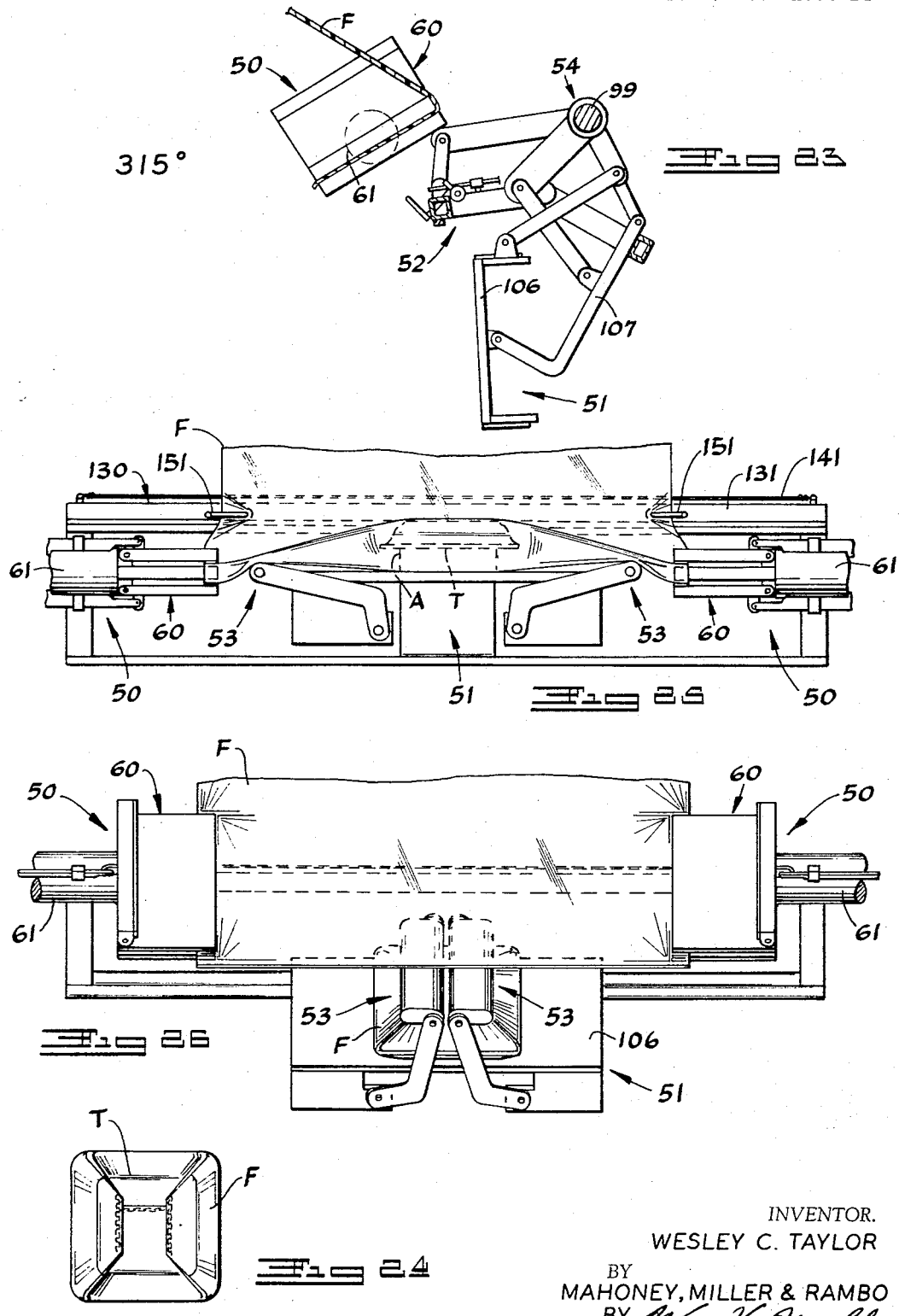

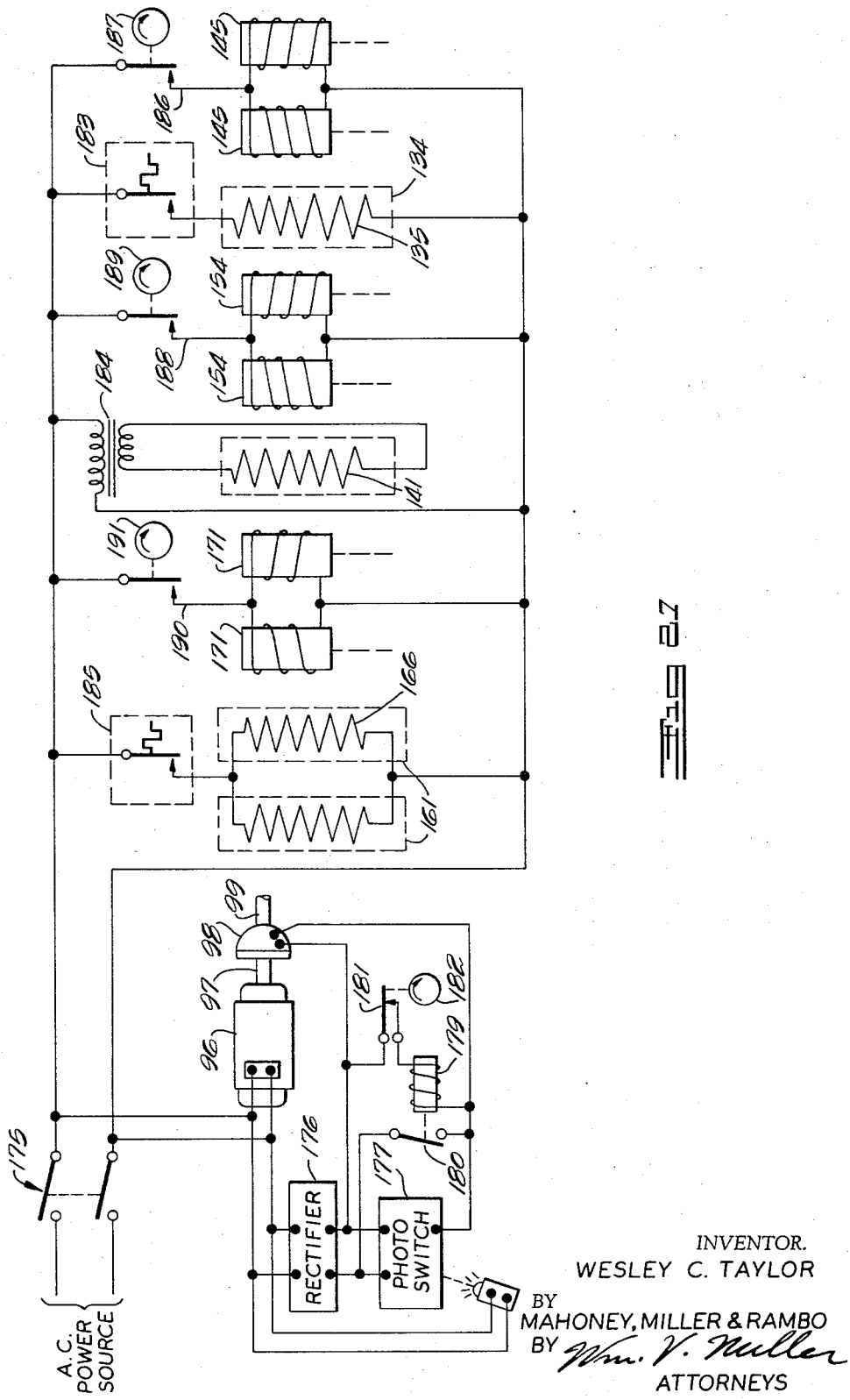

United States Patent Office 3,370,394
Patented Feb. 27, 1968

1

3,370,394
PACKAGING APPARATUS AND METHOD
OF PACKAGING
Wesley C. Taylor, Columbus, Ohio, assignor of one-half to The Cottingham Paper Co., Columbus, Ohio, a corporation of Ohio
Filed Jan. 7, 1966, Ser. No. 519,217
11 Claims. (Cl. 53—33)

This relates, in general, to method and packaging apparatus for mechanically wrapping articles in a pliable material supplied in a continuous, elongated web. It relates, more specifically, to method and packaging apparatus which is capable of utilizing a pliable wrapping material of the type characterized as a resilient, heat-sealable, soft-film and performs the wrapping operation with concurrent, longitudinal and transverse stretching of the film.

Mechanical packaging apparatus of the known prior art has been designed only for utilizing wrapping material having a degree of stiffness of at least a predetermined minimum value. Such prior art apparatus as is known is usually of the type which engages the leading edge of the web of wrapping material and is adapted to draw the material through the wrapping machine in engagement with the article to be wrapped with additional components or elements sequentially actuated to engage the film at desired points and complete selected portions of the wrapping operation. In order to accomplish their objective, the prior art machines are limited to utilization of a wrapping material having a predetermined stiffness to provide limited self-support during portions of the wrapping operation. This is necessary as these machines do not continuously engage and support the material during all stages of a wrapping operation and the several elements selectively engage the film at predetermined times for performance of their respective operations. Since the film will be unsupported at times, it must have adequate stiffness to maintain a desired position where the elements may readily engage and grasp the material at the appropriate point in the wrapping operation.

It is often desired to obtain an article wrap in which the material is tightly drawn about the article to further exclude air thereby enhancing the article preservation capabilities of the package. As one expedient, the packaging machines of the prior art have been adapted to utilize a material which is characterized as a heat-shrinkable material and, subsequent to the wrapping operation, the wrapped article is subjected to a heating operation which will shrink the material and thereby obtain the desired result of tightly drawing the film about the article. Although this technique is capable of providing a tightly wrapped article as desired, there is a limitation in that some articles may not be subjected to a heating operation.

Consequently, materials (such as the heat-shrinkable, polyvinyl chloride films) have been developed which may be preliminarily stretched and, when wrapped about an article and released, will contract and thereby draw tightly about the article. These materials, while having the desired resilient characteristics, are referred to as soft-films in that the stiffness characteristic is well below the predetermined minimum value which is required for utilization with the prior art machines. Such soft-film materials are incapable of providing the necessary self-support and must be continuously supported or restrictively engaged during the wrapping operation. Release of such a soft-film material during a wrapping operation, after it has been removed from a customary supply roll, will result in the film folding about itself into an unusable mass. The several elements of the wrapping machines for performing the folding operation will, therefore, be unable to grasp the material and perform the desired function.

2

It is, therefore, the objective of this invention to provide a method and packaging apparatus which is capable of utilizing a soft-film wrapping material and perform a wrapping operation in which such a resilient, pliable, soft-film material is first stretched and then permitted to contract and draw tightly about the article to exclude air from the article. The packaging apparatus of this invention is capable of performing the desired operation as it incorporates elements and components which continuously engage and support the film during the wrapping operation. The elements engage the material at the beginning of the wrapping cycle and only release their respective portions of the film at times during the wrapping cycle when their respective operations are completed and continued support or restrictive engagement is unnecessary. Concurrently with the continuous engagement and support of the film during the wrapping operation, the several elements of the packaging apparatus are selectively operable to effect both longitudinal and transverse stretching of the film whereupon, subsequent to release, the material will contract to form a tightly wrapped package.

It is a further object of this invention to provide a method and packaging apparatus for utilizing a soft-film, heat-sealable material and capable of performing a completely automatic wrapping operation which concludes with heat-sealing operations for bonding overlapped portions of the material together.

It is also an object of this invention to provide a method and packaging apparatus capable of utilizing a soft-film, resiliently pliable wrapping material supplied in a continuous web form and which is operable to mechanically complete an article wrapping operation in an automatically controlled sequence.

These and other objects and advantages of this invention will be readily apparent from the following detailed description of an embodiment of the packaging apparatus of this invention and the accompanying drawings.

In the drawings:

FIGURE 2 is a front end elevational view taken along lines 2—2 of FIGURE 1.

FIGURE 3 is a left side elevational view as seen in FIGURE 1 with a portion of the supporting structure broken away.

FIGURE 4 is a fragmentary vertical sectional view on an enlarged scale taken along line 4—4 of FIGURE 1.

FIGURE 5 is a vertical sectional view similar to FIGURE 4 but showing the several elements as displaced during a wrapping operation.

FIGURE 6 is a fragmentary top plan view of that portion of the apparatus shown in FIGURE 4.

FIGURE 7 is a vertical elevational view taken along line 7—7 of FIGURE 6.

FIGURE 8 is a vertical sectional view taken along lines 8—8 of FIGURE 6.

FIGURE 9 is a fragmentary sectional view of the clamping mechanism and associated support and actuating mechanism taken along line 9—9 of FIGURE 1.

FIGURE 10 is a transverse sectional view taken along lines 10—10 of FIGURE 9.

FIGURE 11 is a top plan view of the clamp as seen in FIGURE 9 with a portion of one jaw broken away showing the center member.

FIGURES 14 through 23, inclusive, are diagrammatic, vertical sectional views similar to FIGURE 4 sequentially illustrating a wrapping operation.

FIGURE 24 is a diagrammatic illustration of a wrapped article showing the fold and seal lines.

FIGURE 25 is a diagrammatic vertical sectional view taken along lines 25—25 of FIGURE 18 showing the transverse stretching of the film and operation of the spreader fingers.

FIGURE 26 is a vertical sectional view taken along line 26—26 of FIGURE 22 showing the operation of the end folding and sealing mechanism.

FIGURE 27 is a schematic diagram of the electrical circuit for automatically controlling the operation of the wrapping apparatus.

Figure 1:
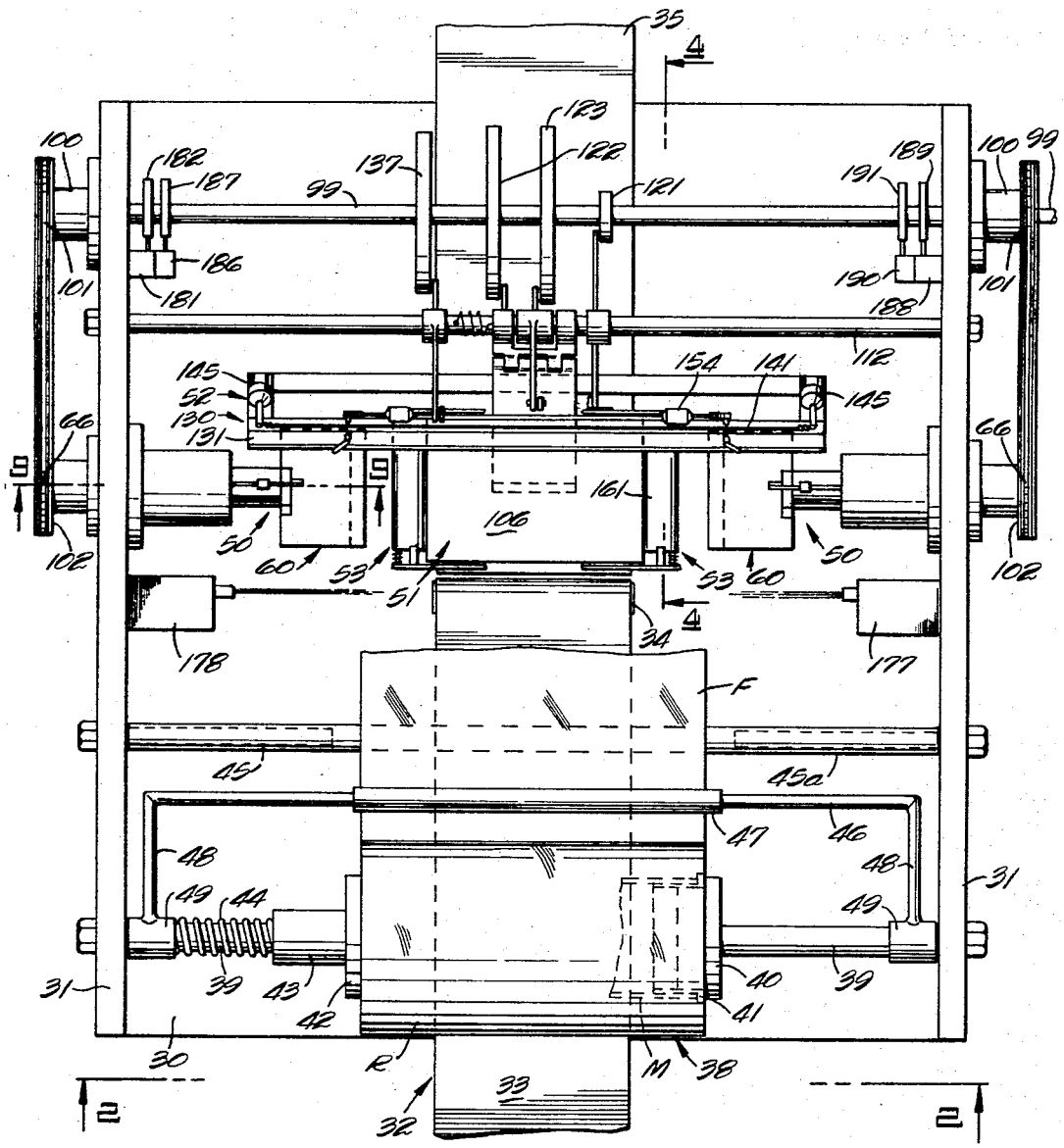
FIGURE 1 is a top plan view of a packaging apparatus embodying this invention.

Having reference to the drawings and, in particular, FIGURES 1, 2 and 3, a packaging apparatus embodying this invention is shown in its entirety and is seen to include structural supporting members comprising a base plate 30 and a pair of upstanding, spaced-apart side walls 31. The several elements of the packaging apparatus are positioned and supported between or on the side walls 31. A supply conveyor 32 is also preferably provided for utilization with the apparatus to facilitate automatic operation of the apparatus. This supply conveyor comprises an endless belt 33 which extends between the side walls 31 and is trained about a supporting end roller structure 34 at a receiving station relative to the several elements of the packaging apparatus. The opposite end of the supply conveyor 32 is positioned adjacent a loading station which may be the discharge station of a machine (not shown) which provides the articles that are to be wrapped by the packaging apparatus. Details of construction of the end roller structure 34 are not shown in the several figures as their specific construction is well known and does not form a part of this invention. A discharge conveyor 35 for the packaging apparatus may also be provided, as shown in FIGURES 1, 2 and 3, to receive the wrapped articles and convey them from the packaging apparatus at the conclusion of the wrapping operation. The discharge conveyor 35 is of the endless belt type having one end thereof forming a receiving station and trained about a supporting roller structure 36 generally located beneath the several elements of the packaging mechanism. This supporting roller structure 36 for the discharge conveyor includes a pair of upstanding brackets 37 which are secured to the base plate 30. Both the supply conveyor 32 and the discharge conveyor 35 are driven and controlled by means external to the packaging apparatus and are not shown with the supply conveyor being driven in timed relationship to the operation of the packaging apparatus to deliver an article to the apparatus at a predetermined time.

The soft-film wrapping material utilized by the packaging apparatus of this invention is supplied in an elongated web form with the web being wound on a suitable reel structure 38. This reel structure includes a central, cylindrical mandrel M on which the film F is wound. Supporting the reel R of soft-film wrapping material in operative relationship to the several elements of the packaging apparatus is a reel-supporting structure carried by the side walls 31 in upwardly spaced relationship to the base plate 30. This reel supporting structure comprises a pair of shaft elements 39 which are rigidly bolted to the side walls 31 in relatively fixed relationship and which project laterally therefrom and toward each other in axially aligned relationship. Secured to the inwardly projecting free end of one shaft 39 in fixed relationship is a reel-engaging disc 40 of circular shape. This disc 40 is formed with an annular rim which interfits with a circular ferrule 41 fixedly mounted in the open end of the mandrel M on which the soft-film F is wound. The ferrule 41 and the disc 40 are preferably formed from a suitable metal, such as steel, and form a bearing structure with the ferrule adapted to revolve about the annular rim of the disc. The opposite shaft 39 is also provided with a similar reel-engaging disc 42; however, this disc is mounted on a central hub 43 which is axially movable on the shaft 39 but not rotatable. Movement of the disc 42 axially toward the respective supporting side wall 31 will disengage the disc from the circular ferrule 41 of the reel mandrel M and permit removal or replacement of a reel. Installation of a reel structure 38 for use with the packaging apparatus is accomplished by a reverse of this operation. The circular reel-engaging disc 42 and associated hub 43 are first displaced axially to enlarge the axial spacing and then returned to a supporting position in relation to the mandrel M of the reel. A biasing force to insure maintenance of the disc 42 in engagement with the reel mandrel is provided by a compression spring 44 of the helically wound, coil type which is mounted on the shaft 39. This spring bears against the hub 43 and a stop on the shaft 39. By appropriately selecting the compression spring 44, a predetermined frictional force will be produced between the discs 40 and 42 and the respective ferrules 41 of the mandrel M to restrict or otherwise retard the rotation or revolution of the reel R and prevent inadvertent unreeling of the film F.

Positioned between the reel structure 38 and the operative elements of the packaging mechanism is a guide bar 45 comprising an elongated, cylindrical bar extending between and rigidly secured to the side walls 31. The guide bar 45 is provided with a relatively rotatable sleeve 45a and is positioned a predetermined distance from the reel R of film F and forms a fixed point from which the film may be drawn into or towards the elements of the packaging apparatus.

A slack take-up mechanism is also provided in association with the reel structure 38 to assist in maintaining the proper tension on the film F as it is drawn from the reel R. The slack take-up mechanism includes an elongated bar 46 which carries a centrally positioned roller 47. The bar 46 and roller 47 extend transversely to the longitudinal dimension web of film F and parallel to the guide bar 45 and reel R. Each end of the bar 46 is formed with a laterally projecting bracket 48 having a bearing structure 49 secured to the end thereof and adapted to be journaled on a respective one of the shafts 39 to permit vertical swinging movement of the bar 46 and roller 47 which forms an eccentrically mounted weight. At the initiation of an unreeling operation, the inertia and frictional forces of the reel structure 38 and reel supporting structure tend to resist unreeling and the slack portion of the film is taken up resulting in an upward swinging movement of the roller 47 to provide a relatively constant tension although the rate of movement of the film F will be at a constant velocity. At the conclusion of an unreeling operation, the film F would tend to continue to unreel as the rotational friction of the reel structure 38 and reel supporting structure would not be capable of immediately stopping its rotation and thereby increase the slack portion of the film. The roller 47 may then swing downwardly to accommodate the greater length of film which has been unreeled thereby maintaining the film under a substantially constant tension.

The packaging apparatus, as best seen in FIGURES 1, 2 and 3, comprises clamping means 50 adapted to engage and support longitudinal, marginal edge portions of the film F, and article-supporting table 51 to assist in supporting the article during the wrapping operation, folding and sealing mechanisms 52 and 53 adapted to successively operate on respective portions of the film to complete the wrapping operation, and driving means 54 for the preceding elements which includes a cam-type timing and actuation mechanism. Incorporated with the driving means 54 is an electrical circuit having suitable control and sensing devices such as are necessary to provide an automatic operational cycle for a wrapping operation. This electrical circuit is shown in FIGURE 27 with the several conductors being omitted from the other figures to enhance the clarity of illustration of the mechanical structure. The addition or incorporation of the electrical conductors and their connections will be understood and readily accomplished by those skilled in the art.

Primary requirements of the packaging apparatus in accomplishing the previously stated objectives are the capability of releasably engaging and supporting the film during the wrapping operation and to stretch the film in both longitudinal and transverse directions. These objectives are accomplished by the clamping means 50 comprising a pair of identical clamping mechanisms which are supported by the side walls 31 in diametrically opposed relationship for cooperatively engaging and gripping opposed, longitudinal marginal edge portions of the film. Both clamping mechanisms are driven in synchronism through a suitable mechanical connection to the driving means 54. Through cooperative rotational and relative axial movement, the clamping mechanisms envelop the article within the film F and concurrently stretch the film in longitudinal and transverse directions.

One clamping mechanism is shown in detail in FIGURES 9, 10 and 11 and is the clamping mechanism appearing at the left side of FIGURES 1 and 2. Each clamping mechanism comprises a clamping jaw assembly 60, and clamp-supporting shaft 61 on which the jaw assembly is carried for rotational and axial movement, and a cam mechanism 62 for actuating the elements of the clamping mechanism. Mounted in an aperture 63 formed in a respective side wall 31 is a bearing housing 64 in which the clamp-supporting shaft 61 is rotatably supported. The bearing housing 64 is of elongated, cylindrical form having one end thereof projecting through the aperture 63. The elongated bearing housing 64 is desired to provide adequate support for the shaft 61 in order that bending forces resulting from the cantilevered support of the shaft 61 and jaw assembly 60 may be more adequately resisted. Formed about the exterior of the bearing housing 64 is an annular bolt flange 64a to facilitate fastening of the bearing housing to the vertical side wall 31 by suitable capscrews 65. A driving connection to the clamp-supporting shaft 61 is provided by a sprocket gear 66 having an elongated, tubular hub 67. The elongated hub 67 projects axially through the bearing housing 64 and is journaled in a pair of bearing assemblies 68 disposed at opposite ends of the housing. These bearing assemblies 68 may be of the well known ball bearing type to resist radial and thrust forces. Formed at one end of the clamp-supporting shaft 61 is an externally-splined extension 69. The shaft extension 69 is inserted in the cooperatively splined, axial bore 70 of the hub 67. This splined connection permits relative axial sliding movement of the shaft 61 relative to the side wall 31 while transmitting rotational movement to the shaft by means of the sprocket gear 66. A thrust plate 71 may be threaded onto the inboard end of the sprocket gear hub 67 to provide increased resistance to axial movement of the hub and sprocket gear.

The clamping jaw assembly 60, which is carried at the unsupported end of the shaft 61, forms a double clamp structure with each section adapted to independently engage and support respective longitudinally spaced marginal edge portions of the film F. Each clamping section of the jaw assembly 60 includes a common, central anvil member 72 which is rigidly secured or attached to the shaft 61 in fixed relationship and is rectangularly shaped having an elongated marginal edge portion disposed transversely to the shaft axis. Also carried by the shaft 61 are a pair of independently operable clamping plates 73 and 74 which cooperate with the central anvil member 72 and are designated herein as the bottom and top clamping plates. Each clamping plate 73 and 74 is rectangularly shaped having an elongated marginal edge portion adapted to overlie an opposed marginal edge portion of the member 72 and is pivotally connected to the shaft 61 for swinging movement in a plane normal to the center member 72. The hinge structure for pivotally connecting each clamping plate, 73 or 74, to the shaft 61 can be best seen in FIGURE 11. With reference to this figure, each plate 73 or 74 is seen to be formed with a recess 75 extending along a marginal edge portion which is adapted to receive a hinge block 76 secured to the end of the shaft 61. Extending longitudinally of the respective plates 73 or 74 and journaled in the hinge block 76 is a pivot pin 77.

Secured to a face of each of the movable clamping plates 73 and 74 along a longitudinal marginal edge portion is an elongated strip of frictional material 78 which cooperates with the center member 72 to enhance the clamping and gripping effectiveness of the jaw assemblies. Normally biasing each of the clamping plates 73 and 74 into clamping relationship with the center member 72 is a biasing spring 79. The biasing spring 79, which may be of the helical coil type, is mounted on the hinge pin 77 which is exposed in the recess 75 of the respective clamping plate and cooperatively engages the shaft 61 and respective plate to provide the biasing force.

The length of the respective plates 73, 74 and center member 72 is determined by the average length of the article on which the packaging machine is designed to perform a wrapping operation. Thus, the size of the package which may be wrapped may be slightly greater or less than the length of the longitudinal edge portion covered by the frictional material 78.

Actuation of the clamping jaw assembly 60 as to its clamping operation and as to its axial movement relative to the side walls 31 is effected by the cam mechanism 62. This cam mechanism 62 comprises a cylindrical hub having a central axial bore 80 adapted to receive an end of the supporting shaft 61. Formed on the exterior of the cam mechanism 62 is an annular bolt flange 81 to facilitate attachment of the cam mechanism to the side walls 31 by means of suitable fastening devices, such as the cap screws 82. Formed on the interior of the hub and extending circumferentially around the bore 80 are three independent, relatively axially spaced cam races or tracks 83, 84 and 85. Each of the cam tracks is adapted to be cooperatively engaged by a respective cam follower 86, 87 and 88 for operation of the shaft 61 and the top and bottom clamping plates 73 and 74. The cam follower 86 comprises a radially extending lug formed on the exterior of the supporting shaft 61. Each of the cam followers 87 and 88 is formed with a respective actuating link 89 and 90 which is connected with a respective top or bottom clamping plate, 74 or 73. Longitudinally extending guide slots 91 and 92 are formed in the supporting shaft 61 for receiving the respective connecting links 89 and 90 and to permit relative sliding axial movement. Each of the cam races 83, 84 and 85 extends circumferentially around the interior of the bore 80 forming a predetermined path which will result in actuation of the shaft 61 or the clamping plates 73 and 74 in a desired timed relationship to the rotational movement of the shaft. Thus, as the shaft 61 is rotated by means of the sprocket gear 66 through a mechanical connection to the driving means, the cam follower 86 of the shaft will engage the cam track 83 and result extension or retraction of the shaft and clamping jaw assembly 60 relative to the side wall 31. Similarly, the connecting links 89 and 90 will be axially displaced relative to the shaft 61 through cooperative reaction of their respective cam followers 86 and 87 with the respective cam races 84 and 85. Assuring retention of the links 89 and 90 in their respective slots 91 and 92 are a pair of U-shaped guide brackets 103 which are rigidly fastened to the shaft 61 adajcent the jaw assembly 60. Each link 89 and 90 is free to slide in its respective slot axially of the shaft 61 but will be prevented from being displaced radially as a consequence of the operation of the jaw assembly. This axial movement of the connecting links 89 and 90 is transmitted as rotational swinging movement to respective clamping plates 74 and 73 through a hinge connection. This hinge connection for each clamping plate 74 and 73 includes a short lever arm 93 projecting laterally from the surface of the respective clamping plate. Formed in each of the lever arms 93 is an elongated slot 94 which receives a pivot pin 95 carried by the respective link 89 or 90. The elongated slot 94 is necessary to accommodate the arcuate movement of the lever arm 93 relative to the longitudinal or axial movement of the respective connecting link. In the present embodiment, the cam mechanism is primarily designed to effect opening of the clamping jaw assembly 60 while the springs 79 will be capable of returning the jaw assembly to a clamping configuration and provide the necessary clamping force.

A rotational movement may be imparted to each supporting shaft 61 of the clamping mechanisms through mechanical interconnection with the driving means 54. The driving means 54, as diagrammatically illustrated in FIGURE 27, includes an electric motor 96 having an output shaft 97. Connected to the output shaft 97 is an electromagnetic clutch assembly 98 which is operable to permit intermittent operation of the packaging apparatus although the motor 96 is continously operated. Driven by the clutch assembly 98 is a drive shaft 99 which extends transversely of the side walls 31 of the packaging machine structure and is journaled in bearing assemblies 100 secured to the respective side walls 31. Mounted on the drive shaft 99 on the outer side of a respective side wall 31 are a pair of sprocket gears 101. Each sprocket gear 101 is fixed on the shaft 99 for rotation therewith and in alignment with a respective sprocket gear 66 of the clamping mechanisms. A sprocket chain 102 is trained about the respective pairs of aligned sprocket gears 101 and 66 and completes the driving connection to the clamping mechanisms.

Centrally positioned between the side walls 31 is the article-supporting table 51. Forming the article-supporting surface of the table is a rectangular plate 106 carried by a L-shaped bracket 107 and rocker arm 107a. A relatively shorter leg of the L-shaped bracket 107 is pivotally secured to the lower face of the rectangular plate 106 by an elongated hinge pin 108 extending through the upper marginal edge portion of the bracket leg with the ends of the pin journaled in respective lugs 109 attached to the plate. The opposite leg of the L-shaped bracket 107 is connected to the rocker arm 107a by a hinge structure which includes a hinge pin 110 thus permitting their relative swinging movement. Formed with the rocker arm 107a at the opposite end are a pair of axially spaced bearing sleeves 111. The bearing sleeves 111 are adapted to be journaled on an elongated shaft 112 to permit swinging movement of the L-shaped bracket 107, rocker arm 107a and plate 106 relative to the shaft 112. The shaft 112 is disposed in spaced parallel relationship to the drive shaft 99 extending transversely between the side walls 31 by which it is carried. The shaft 112 is also horizontally disposed and thus the article-supporting table 51 will swing in a substantially vertical plane to assist in the support of an article during a wrapping operation.

It is necessary that the rectangular plate 106 be coordinated in its movement relative to the rotational movement of the L-shaped bracket 107. This coordination of movement is effected by a connecting arm 113 which is pivotally connected by a pin and bracket assembly 114 secured to the rear edge of the plate 106 and operatively controlled at the opposite end and a pair of biasing torsion springs 115. The torsion springs 115 are mounted on the hinge pin 108 and cooperatively engage the plate 106 and the bracket 107 to maintain the plate in a predetermined position to the bracket, preferably perpendicular to the shorter leg. The opposite end of the connecting arm 113 is pivotally connected to a rocker arm 116 which is journaled on the shaft 112 and is rotatable in a vertical plane. A roller type cam follower 117 is carried by the rocker arm 116 on an arm 116a which projects a distance toward the drive shaft 99.

Control of the movement of the plate 106 and its maintenance in a desired position to advantageously support the article during the wrapping operation is effected by the drive means 54 through a connecting linkage mechanism and three cams 121, 122 and 123. The cams 121, 122 and 123 are mounted on the drive shaft 99 in a predetermined, fixed relationship and are rotatable therewith. Cam 121 is designed to cooperatively engage the cam follower 117 at predetermined times during a wrapping operation to effect swinging movement of the plate 106 relative to the bracket 107. Movement of the rocker arm 107a is effected by the cam 122 cooperatively engaging a roller type cam follower 118 carried by an arm 119 which is attached to one of the bearing sleeves 111. As will be subsequently explained in detail, the rocker arm 107a must be swung past a vertical position (see FIGURE 5) in a counterclockwise direction and the necessary forces for effecting this movement is provided by a torsion spring 120 mounted on the shaft 112 and operatively engaged with the shaft and arm 119. The spring 120 maintains the roller 118 in engagement with the cam 122 which will thus limit the counterclockwise rotation of the rocker arm 107a. Control of the movement of the L-shaped bracket 107 is effected by a rocker arm 124 in cooperation with the cam 123. The rocker arm 124 is also journaled on the shaft 112 and is formed with an extension arm 125 which carries a roller-type cam follower 126 for engaging the cam 123. As can best be seen by reference to FIGURE 6, the rocker arm 124 is disposed between the axially spaced bearing sleeves 111 for optimum weight balance. A connecting link 127 pivotally connected at one end to the arm 124 by a pin 128 also connects with the bracket 107. Connection of the link 127 to the arm 124 is by a bracket and pin assembly 129.

Operation of the clamping means 50, as to both rotational and axial movement, in cooperation with a synchronized operation of the article-supporting table 51, will perform a preliminary wrapping operation to the extent that the article will be enveloped in a length of the film F which is now in the form of an open-ended tube. The ends of the tube are now held and supported by the respective opposed clamping mechanisms with the ends being relatively flattened forming top and bottom portions. The rotational movement of the clamping mechanisms in enveloping the article has also simultaneously stretched the film F in a longitudinal direction and the film will now be tightly wrapped about the article. To complete the wrapping operation, it is necessary at this point to effectively seal the overlapped portions of the film relative to the longitudinal direction and to fold and seal the laterally or transversely extending end portions of the tubularly shaped film. The required folding and sealing operations are performed by the two folding and sealing mechanisms 52 and 53 which form the bottom seal and the end flap seal, respectively.

Referring specifically to FIGURES 4, 6 and 7, an embodiment of the folding and sealing mechanism 52 for performing the sealing operation with respect to the bottom of the package is illustrated in enlarged scale views showing the details of construction of this mechanism. This mechanism comprises, in general, a structurally rigid frame 130 including an elongated clamping bar 131 and is carried by the article supporting table 51 for swinging movement in a vertical plane and is supported on the table by means permitting relative swinging movement of the bar 131 and table. Supporting the clamping bar 131 is an elongated bar 132 of tubular form which is secured to the L-shaped bracket 107 of the table 51 and extends transversely of the apparatus. A pair of upstanding brackets 132a are rigidly connected to the bar 132 at each end thereof with lateral extension arms 131a of the clamping bar 131 being journaled on the upper ends of the brackets 132a whereby the clamping bar may swing in a vertical plane relative to the table bracket 107. In the present embodiment, the extension arms 131a and the clamping bar 131 are formed from tubular bars of rectangular cross section which are rigidly welded together to form a structurally rigid unit of rectangular configuration. A torsion spring 133 carried by each upstanding bracket 132a is adapted to engage a respective extension arm 131a to normally bias the arms and clamping bar 131 supported thereby in a downward, counterclockwise direction as viewed in FIGURE 4. The length of the extension arms 131a and upstanding bracket 132a are such that the clamping bar 131 will swing along an arcuate path above the normal position of the article-supporting table 51 and when in an operative, lowered position will engage the article that is being wrapped. The point of engagement of the bar with the article is preferably displaced a distance rearwardly from the mid-point.

Figure 13:
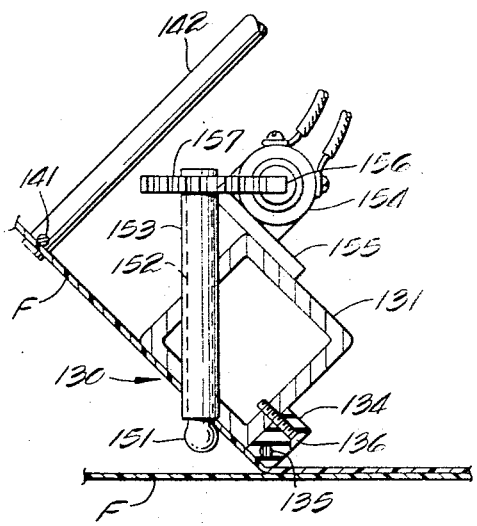
FIGURE 13 is a transverse sectional view taken along lines 13—13 of FIGURE 12.

Secured to the clamping bar 131 is a suitable heat-sealing element of the electrical resistance type which may extend substantially the length of the clamping bar. The heat-sealing element 134, as is best shown in the cross-sectional view of FIGURE 13, is seen to comprise an electrical insulating body in which an electrical resistance wire 135 is embedded. The heat sealing element is secured to the clamping bar 131 on a lower surface by a suitable fastening means such as the cap screws 136. It will be noted that the heat-sealing element 134 is formed with a rounded nose for engaging the film F to prevent rupturing or tearing.

During the cyclic operation in the course of performing a wrapping operation on an article, the clamping bar 131 will be permitted to swing downwardly in response to the operation of the torsion spring 133 into engagement with the overlapped portions of the film enveloping the article. In this position, the rounded nose of the heat-sealing element 134 will be in contacting engagement with the film F. The weight of the clamping bar 131 and the force of the spring 133 will maintain the overlapped portions of the film F in contacting engagement with each other and with the article being wrapped whereby a transfer of heat from the heat-sealing element 134 to the film will effect a seal between the overlapped portions of the film.

Controlling the movement of the clamping bar 131 is a cam 137 and linkage mechanism forming a part of the driving means 54 and mounted on the drive shaft 99 and shaft 112. A rocker arm 138 journaled on the shaft 112 by a sleeve bearing 138a carries a roller-type cam follower 139 which is adapted to engage the cam 137. The cam follower 139 is mounted on an extension of the rocker arm 138. Pivotally connected to the free end of the rocker arm 138 is connecting link 140 which is also connected to the clamping bar 131 by a bracket and pin assembly 140a. Rotation of the cam 137 as determined by the driving means 54 will thus maintain the clamping bar 131 in an elevated, inoperative position or permit the clamping bar to swing downwardly into a lowered, operative position to effect sealing of overlapped portions of the film.

At the conclusion of a bottom sealing operation as performed by the clamping bar 131 and its associated heat-sealing element 134, the portion of the film F surrounding the article must be severed from the remaining web of material being unreeled from the supply reel R to permit completion of the folding operation with respect to the end folding elements. This film severing operation may be most conveniently accomplished while the clamping bar 131 is in a lowered position. Accordingly, the clamping bar 131 is provided with a suitable film severing means. In this instance, the film severing means comprises an electric current conducting wire 141 having a specific resistance such that, when energized by a predetermined electrical power source, sufficient heat will be transferred to effect a severing of the film when brought into contact therewith.

As can be seen in FIGURES 4, 5, 6, and 7, the wire 141 extends substantially the length of the clamping bar 131 and is supported by a structure permitting movement of the wire a distance outwardly from an inoperative position above the clamping bar (FIGURE 4) to an operative, severing position (FIGURE 5). Forming the supporting structure for the wire 141 are a pair of structurally rigid rods 142 which are mounted for reciprocable sliding movement in respective pairs of guide brackets 144 which are mounted on the top of the extension arms 131a. A portion of each rod 142 extends forwardly from a respective guide bracket 144 for the attachment thereto of an end of the wire 141 by resilient means 143 for maintaining the wire 141 in a taut, linear configuration. Although the wire is structurally supported by the rods 142 the wire is electrically insulated therefrom.

The opposite ends of the rods 142 extend a distance rearwardly from the brackets 144 and connect with actuating means for effecting their displacement to place the wire 141 in an operative position for severing of the film F. The end of each rod 142 is operatively connected to an electric solenoid 145 mounted on the respective arm 131a and which may be selectively energized to forwardly displace the rods 142. Return of the severing wire 141 to the inoperative position is accomplished by a pair of compression springs 148 which are mounted on the respective rods 142 between the pairs of supporting brackets 144. One end of each spring 148 operates against an abutting end of a bracket 144 and a stop collar 149 which is secured to the respective rod between the supporting brackets.

To facilitate the severing of the film F and assure continued support of the film along the longitudinal marginal edge portion, the clamping bar 131 is also provided with means engageable with the longitudinal marginal edge portion of the film to assist in supporting the film and maintaining the film in contacting engagement with the clamping bar. This means includes a pair of relatively spaced spreader fingers 151 which are carried by the clamping bar 131. Each spreader finger 151 is formed from an elongated rod of cylindrical cross section and is pivotally supported at one end for swinging movement in a plane beneath the clamping bar 131. Supporting each finger 151 for swinging movement is an elongated shaft 152 journaled in a bearing sleeve 153. The bearing sleeves 153 extend through the clamping bar 131 at an angle which will permit swinging of the fingers 151 in a plane substantially parallel to the bottom surface of the article to clamp the film F tightly to a surface of the clamping bar. The bearing sleeves 153 are rigidly secured to the clamping bar 131.

Figure 12:
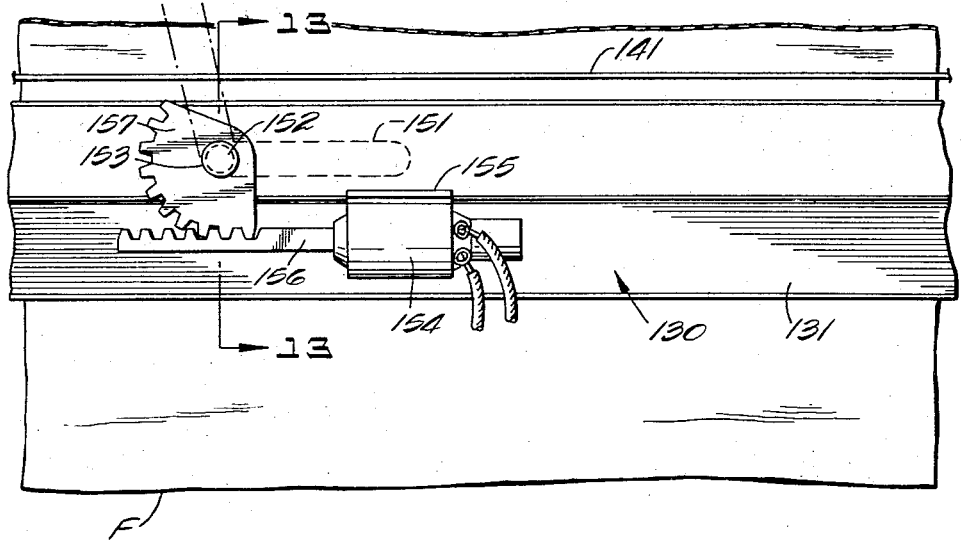
FIGURE 12 is an enlarged fragmentary top plan view taken along lines 12—12 of FIGURE 5 showing structure details of the spreader finger mechanism at the right side of the apparatus.

Swinging movement of each spreader finger is effected by actuating mechanism such as an electrical solenoid 154. Each solenoid 154 is secured to the clamping bar 131 by a respective supporting bracket 155. A movable armature 156 of the solenoid projects a distance from one end of the solenoid having a number of gear teeth formed thereon. A segmental pinion gear 157 having mating gear teeth is secured to the upper end of the rotatable shaft 152 and is adapted to intermesh with the solenoid armature gear teeth. Energization of the solenoid 154 will extend the armature 156 resulting in rotation of the shaft 152 and swinging of the respective finger 151 to the clamping position shown in FIGURE 12. Return of the spreader finger 151 to an inoperative position is effected by a biasing spring (not shown) operating on the solenoid armature 156 and is effective when the solenoid is deenergized. Preferably, the fingers 151 revolve through an arc slightly greater than 90° to avoid interference with the film F and clamping means 50.

Subsequent to completion of the bottom folding operation, the folding and sealing mechanism 53 for effecting the folding of the ends of the tubular-shaped envelope of film surrounding the article are actuated to complete the wrapping operation. The end flap folding and sealing mechanism 53, which can be best seen by reference to FIGURES 4, 5, 6, and 7, comprises two similar units which are positioned at opposite ends of the rectangular plate 106 of the article-supporting table 51. Each of the units 53 includes a wiper bar 161 which is supported on the ends of a pair of arms 162. The arms 162 are secured to respective depending brackets 163 attached to the table plate 106 for independent swinging movement in a vertical plane. Each arm 162 is pivotally connected or attached at one end to the respective bracket 163 by suitable pivot means 164 with the arm being positioned a distance outwardly from the edge of the plate 106 to permit its free movement in a vertical plane.

Each wiper bar 161 comprises an elongated tubular member having a generally oval cross section. Extending along one longitudinal marginal edge of the bar 161 and secured thereto is an elongated hinge pin 165. The ends of the hinge pin 165 project a distance from the end of the wiper bar 161 and are attached to the free ends of the pivot arms 162 to permit relative rotative movement. Extending along the opposite longitudinal edge of the wiper bar 161 is a heat-generating element having resistance wire 166. The resistance wire 166 is embedded in an insulating compound 167 deposited in the marginal longitudinal edge portion of the bar. Suitable electrical conductors, not shown, are appropriately connected to the resistance wire 166 to energize the wire through the operation of the control circuit as shown in FIGURE 27.

To accomplish the preferred folding operation by means of the wiper bar 161, it is advisable that the bar 161 is biased toward a substantially horizontally disposed position when the arms 162 are in a retracted position as shown in FIGURE 7. Biasing of the wiper bar 161 may be effected by suitable spring members 168 which are interconnected between the pivot arms 162 and the wiper bar 161 and are operative to urge the wiper bar 161 at the left side of FIGURE 7 in a counterclockwise direction and to urge the wiper bar at the right side in a clockwise direction. A stop 173 is attached to each arm 162 for cooperatively engaging the wiper bar 161 and preventing further rotative movement as a consequence of the force exerted by the biasing spring 168.

The pivotal connections between the arms 162 and the respective brackets 163 and wiper bar 161 are formed to permit relative angular displacement of the arms 162. This will permit the arms 162 to swing upwardly independently of each other whereby the wiper bar 161 may more readily follow the contour of the article being wrapped. Upward swinging movement of each pair of arms 162 and wiper bar 161 is effected by a pair of tension springs 169 which may be of the helically wound coil type and which are interconnected between brackets 169a attached to the lower surface of the plate 106 and the respective arm 162. An elongated bar or rod 170 extending between a pair of the pivot arms 162 at a distance from the pivot point forms a convenient connection for the tension springs 169. Each spring 169 is thus operative to effect swinging movement of a respective arm 162 independently of each other arm.

Each wiper bar 161 is maintained in a normally inoperative position, as is shown in FIGURES 4, 6 and 7, by an electrical solenoid 171. The solenoid 171 is pivotally carried by one of the brackets 163 and is provided with an armature 172 which is connected to a respective bar 170 by suitable means. The solenoid 171 is connected in the electrical control circuit shown in FIGURE 27 for the energization of the solenoid as determined by the operational sequence. Enregization of the respective solenoids 171 will result in urging the arms 162 of the left folding mechanism in a counterclockwise direction and urging the arms of the right folding mechanism in a clockwise direction and will overcome the opposing force of the springs 169.

The several electrically actuated elements of the packaging apparatus are connectable to a suitable power source through the control circuit shown in FIGURE 27. A main power disconnect switch 175 is included in this circuit to control the energization of all elements. The electric motor 96 of the driving means is connected in this circuit to be energized at all times that the main disconnect switch 175 is closed. The driving connection between the motor 96 and the shaft 99, as shown in the several figures of the drawings, is not completed, however, until the electromagnetic clutch 98 is actuated. Providing the power and the necessary control for the energization of the electromagnetic clutch 98 is a suitable rectifier circuit 176 and a photoresponsive switching circuit 177. The photoresponsive switching circuit 177 is of a well known type and is not further described or illustrated except to show the inclusion of a suitable light source 178. This photoresponsive switching circuit 177 is of a type which does not complete an electrical circuit to the load element to which it is connected until the light beam is interrupted. The light beam interruption, in this instance, results from a passage of an article to be wrapped toward the receiving station of the packaging apparatus and initiation of the cyclic operation of the packaging apparatus is thereby effected through energization of the electromagnetic clutch 98 resulting in rotation of the drive shaft 99.

However, subsequent to the passage of the article through the light beam, the photoresponsive switch will again disconnect the respective load from the power source and result in deenergization of the clutch 98. To maintain the necessary driving connection for the completion of one operational cycle, a holding circuit is provided to maintain the electromagnetic clutch 98 in an energized condition. This holding circuit includes a relay switch 179 which is connected in circuit with the clutch 98 to bypass the photoresponsive switch mechanism 177. The switch 179 includes a set of normally open switch contacts 180 which are closed upon energization of the coil and will complete a circuit to the clutch 98. The relay coil is connected in circuit with the parallel connected switch contacts 180 and the photoresponsive switch 177 so as to be energized when either are closed. A cam-actuated switch 181 of the normally closed type is also connected in circuit with the relay coil and will complete a circuit therethrough when closed. The switch 181 may be opened through operation of its associated cam 182 which is mounted on the drive shaft 99. At the zero position of the shaft 99, the cam 182 will maintain the switch 180 in an open position and the relay coil 179 will be deenergized and its contacts 180 will be open. After a few degrees of rotation of the drive shaft 99, the cam 182 will permit the switch 181 to close and complete a circuit through the relay coil 179, resulting in closing of the contacts 180. These contacts will bypass the photoresponsive switch 177 and maintain the clutch in an energized, operative condition for continued rotation of the shaft 99. The packaging apparatus is designed to complete a wrapping operation in one revolution of the drive shaft 99. At the conclusion of the wrapping operation and at about 360° revolution of the drive shaft 99, the cam 182 will open the switch 181 thereby interrupting the relay coil circuit resulting in opening of the contacts 180 and deenergizing of the electromagnetic clutch 98 and stopping further rotation of the drive shaft 99.

The cut-off wire 141 and each of the heat-sealing elements 135 and 166 are continuously connected in circuit during any prolonged period of operation as determined by closing of the main power disconnect switch 175. Continuous connection of these elements eliminates any operational delay that would result from an On-Off operation as a finite time is required to bring the elements up to a desired operation temperature level. To prevent overheating of the elements, as would occur with continuous energization, a temperature-responsive switch mechanism, 183 and 185, is connected in circuit with a respective one of the heating elements 135 and 166 and a transformer 184 having an appropriate turns-ratio is connected in circuit with the cut-off element 141. Each switch mechanism includes a set of contacts which are connected in series with the respective heating element and are responsive to the temperature of the element and operable to maintain the element at a relatively constant temperature.

Also connected in this control circuit are the actuating solenoids 145, 154, and 171 of the film cut-off, spreader fingers and end-flap fold mechanisms, respectively. Each set of solenoids is independently controlled by a respective switch mechanism which is controlled by the drive shaft 99 to assure operation of the mechanism at a desired, predetermined point during a wrapping operation. The switch mechanisms each comprise a set of normally open contacts 186, 188 and 190 connected in series with a respective one of the solenoids 145, 154 and 171 and a respective actuating cam 187, 189 and 191. The ams 187, 189 and 191. The cams 187, 189 and 191 are mounted on the drive shaft 99 and are rotatable with the shaft. By appropriately forming each cam surface, each set of switch contacts will be actuated at a predetermined time for proper functioning of the solenoids and associated mechanisms.

Figure 14:
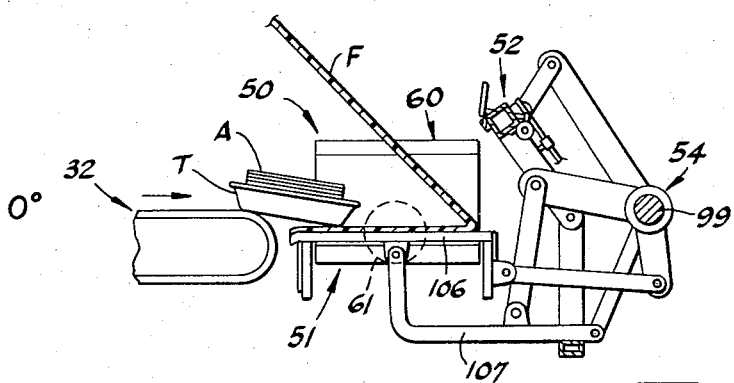

FIGURES 14 through 26 of the drawings diagrammatically illustrate a complete wrapping operation and thereby demonstrate the advantageous wrapping operation performed by the packaging apparatus of this invention. The wrapping operation as illustrated in these figures, starts with the transfer of an article A as carried by its tray T from the supply conveyor 32 at the receiving station of the packaging apparatus and it concludes with ejection of the completely wrapped article from the packaging apparatus. Referring to FIGURE 14, the several elements of the apparatus are shown in what is termed herein as the "initial" or "zero" position. In this position, the clamping mechanism will have engaged opposed, longitudinal, marginal edge portions of the film F by only one section of the clamping jaw assembly 60 with the film extending from the clamping mechanism toward a supply reel of soft film carried by the reel structure. The other movable clamping plate of the jaw assembly will be opened to its maximum position of about 90° with the film extending over the center member. The article-supporting table 51 will be maintained by its respective cams 123 and 122 in the indicated position with the article-supporting, rectangular plate 106 horizontally disposed. Both folding and sealing mechanisms 52 and 53 for the bottom flap and end flaps will be disposed in inoperative positions. The article A and tray T carried by the supply conveyor 32 toward the receiving station of the apparatus will cause the light beam for the photoresponsive switching circuit 177 to be interrupted and thereby initiate the operation of the various elements. Interruption of the light beam between the light source 178 and circuit 177 thereby completes a driving connection from the motor 96 to the drive shaft 99 and initiates operation of the several elements connected thereto.

Figure 15:
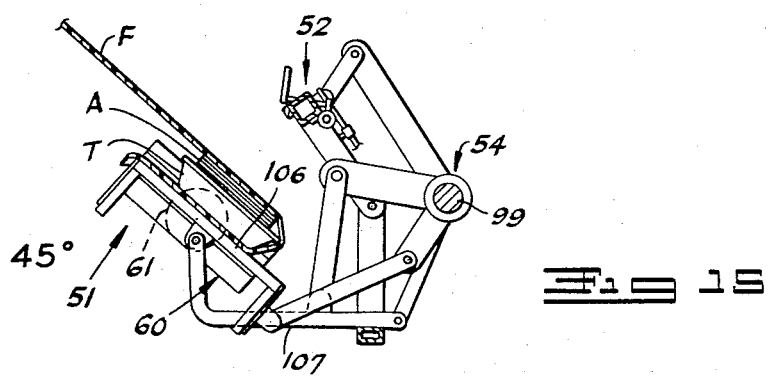

FIGURE 15 shows a wrapping operation after the drive shaft 99 has rotated approximately 45°. The clamping means 50 will have rotated 45° and the rectangular plate 106 of the article-supporting table will have been tilted, as indicated. The bracket 107 supporting the plate 106 will be maintained in its previous position at this point. The tilting movement of the plate 106 is effected by the cam 121 acting on the arm 113 through the roller 117. Tilting of the plate 106 follows the rotation of the clamping means but still provides support for the article A to prevent the entire weight from being absorbed by the soft-film material which could result in excessive stretching of the material depending upon the weight of the article and its associated tray. Also, at this time the second clamping plate of the jaw assembly 60 of each clamping mechanism will have been actuated by its respective cam mechanism and spring to result in the jaw assembly gripping the longitudinal marginal edge portions of the film which extends over the top of the article.

Figure 16:
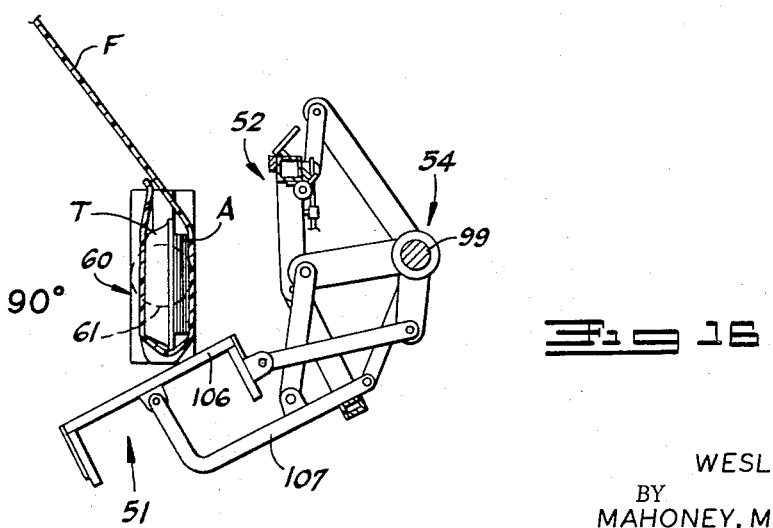

Continued rotation of the drive shaft and associated connected elements from the 45° position of FIGURE 15 will result in further enveloping of the article A and its associated tray T within the film F. As the wrapping operation approaches the 90° point of the operational cycle, the article-supporting table 51 will have swung downwardly to prevent obstruction to continued rotation of the clamping means 50 and the article now supported therebetween. This is indicated in FIGURE 16 where the bracket 107 has now swung downwardly through the operation of the cam 123 and the plate 106 has returned to its normal position relative to this bracket as a result of biasing force of springs 115. However, the plate 106 is also tilted relative to the article as a result of movement of the bracket 107 to prevent obstruction to rotation of the article which is now supported by the clamping means 50. The revolving of the article while forming a surrounding tubular envelope of the film results in the stretching of the film in a longitudinal direction as the thickness of the article is substantially greater than the spacing between the longitudinal marginal edge portions of the film gripped by the jaw assemblies. Simultaneously, with the rotative movement from the 45° point indicated in FIGURE 15 to the 90° point of FIGURE 16, the jaw assemblies will be axially displaced in relatively opposite directions by their respective cam mechanisms 62 to effect a transverse stretching of the film F.

The transverse and longitudinal stretching of the film F will be completed at a time prior to rotation of the apparatus to place the article A and its associated tray T in an inverted position at substantially the 170° position indicated in FIGURE 17. At this point, the article will be completely enveloped by the film F which is in the form of a surrounding tubular envelope with portions of the film being overlapped. The article-supporting table 51 has again been swung upwardly in response to the rotation of cam 123 and the plate 106 will provide support for the article in this position. The effect of transverse stretching resulting from the weight of the article itself is more pronounced when the article is in a more horizontally disposed position than in a vertical position as in FIGURE 16 and it is desired that the article-supporting table be operated to support the article at all times that it is in a more horizontally disposed position. At this point, the cam 137 controlling the movement of the folding and sealing mechanism 52 will have rotated to a position where the holding bar 131 will have been permitted to swing toward the trailing portion of the film F and thereby maintain the overlapped portion of the film in contacting engagement. Heat transferred from the heat-sealing element 134 and generated by the resistance wire 135 will seal the overlapped portions of the film along a transverse line and thereby form the bottom seal of the package wrap.

Also, at this time the spreader fingers 151 will be actuated to clamp the trailing portion of the film F to the holding bar 131 at the longitudinal marginal edges of the film. Actuation of the spreader fingers 151 is effected through energization of the solenoids 154 in response to closing of the switch 188 by the cam 189. The spreader fingers 151 thus support the trailing portion of the film F to prevent its collapse and folding on itself during the transition of the clamping means 50 from supporting the portion of the film enveloping the article to engagement with the longitudinal marginal edge portions of the film preparatory to the start of a succeeding wrapping operation.

Upon further rotation of the drive shaft 99 in completing the wrapping operation, the mechanisms and elements will progress to the configuration as shown in FIGURE 18. In this view, the apparatus has been rotated through approximately 180° of the wrapping cycle. At this point, the article-supporting table and its associated rectangular plate 106 has been returned to a substantially horizontal position. The clamping mechanisms 50 have also been rotated 180° and will be actuated to open slightly and release the longitudinal marginal edge portions of the film.

Prior to release of the tubular envelope of film F surrounding the article by the clamping means 50, the end-flap folding and sealing mechanisms 53 will also be released from their inoperative positions. Their release is effected through deenergization of the solenoids 171 in response to the opening of switch 190 as a result of the rotation of cam 191. Prior to this time, the switch 190 has been maintained closed by the cam 191 with consequent energization of the solenoids 171. The wiper bars 161 are thus permitted to swing upwardly under the control of the springs 169 but their upward movement is limited by the film F surrounding the article and supported by the clamping means 50 (see FIGURE 25).

FIGURE 25 further illustrates this position in the sequence of the wrapping operation but immediately prior to opening of the clamping means 50. This figure, as previously indicated, refers to FIGURE 18 and is a transverse elevational view. From this view, it can be readily seen that the soft film F has been subjected to a transverse stretching and is being held in supported relationship by the clamping mechanisms 50.

Subsequent to the release of the end flap folding and sealing mechanisms 53, the clamping means 50 may be disengaged from the film surrounding the article A and the tray T. The film F is supported by the spreader fingers 151 at this point and assures maintenance of the trailing portion of the film in a flat configuration with the longitudinal edges straight. The article A and tray T are maintained in clamped engagement with the table 51 by the holding bar 131 and prevents displacement thereof. Upon release of the film by the clamping means 50, the tubularly formed portion of the film will begin to contract to their original transverse dimension. However, this type of material contracts relatively slowly and the wiper bars 161 will continue their upward swinging movement until stopped by engagement with the holding bar 131. The marginal end portions of tubular envelope of film will thus be clamped to the holding bar 131 and further sealing of the overlapped portions of the film will result from transfer of heat from the sealing element 134. The springs 169 effecting the upward swinging movement of the wiper bars 161 are independent in their operation with the result that the forward end of each bar will be swung upwardly a relatively greater distance than the rear end. This effect can be assured through utilization of a relatively stronger spring 169 at the forward ends of the wiper bars 161.

Concurrently with the upward swinging movement of the wiper bars 161, each wiper bar will rotate about its own hinge pin 165 in accordance with the configuration of the article A and tray T substantially as shown in FIGURE 26. This relative rotation of the wiper bars 161 permits accommodation of varied article heights by a specific machine as the bars will rotate to engage the film and the article. During contact of the wiper bars 161 with the film, heat generated by the resistance wires 166 will be transferred to the film and form a seal between overlapped portions of the film which are in contacting engagement.

With continued rotation of the drive shaft 99, the article-supporting table 51 will be initially moved rearwardly from the position of FIGURE 18 toward the position shown in FIGURE 19 and permitted to swing downwardly through the operation of cams 122 and 123. The rearward movement of the table 51 also displaces the clamping bar 131 to a position where the clamping bar will not interfere with rotation or operation of the clamping means 50. Concurrently with the rearward and downward movement of the table 51, the bottom folding and sealing mechanism 52 will follow the movement of the article and the holding bar 131 will engage the trailing portion of the film F and hold this portion of the film in contacting engagement with that portion of the film enveloping the article, substantially as shown in FIGURE 19.

Continuing the wrapping operation from FIGURE 19, the clamping means 50 will rotate to approximately a 225° position as shown in FIGURE 20 with the bottom clamping plates 73 and 74 swung to a fully open position in response to the cam mechanism 62. The bottom holding and sealing means 52 will continue to clamp the article to the table 51 and support the trailing portion of the film F in a flat configuration to permit the clamping means 50 to again engage the film along the longitudinal marginal edge portions. During the downward swinging movement of the table 51, the film F will be drawn through the space in which the clamping means 50 operate and provide a length of film for the jaw assemblies 60 to grip. Also, the table 51 clamping bar 131 will be removed from the space in which the clamping means 50 operates and thereby avoid interference therewith.

Continuing the wrapping operation to the position shown in FIGURE 21, it will be seen that the clamping means is actuated to again engage a longitudinal marginal edge portion of the trailing portion of the film F. At this point in the rotation of the clamping means 50, the cam track 83 and cam follower 86 will cooperate to extend the respective jaw assemblies 60 toward the center of the wrapping apparatus. In this position, the longitudinal marginal edge portions of the film will again overlie the central member 72 of the jaw assembly. The bottom clamping plate 73 will then be actuated through operation of the associated cam track 85 and follower 88 and the spring 79 to clamp the material between the opposed surfaces of the frictional material 78 secured to one clamping plate 73 and the central member 72.

Following the clamping of the soft film F between the lower clamping plate 73 and the center plate of the jaw assembly, the trailing portion of the film F may be severed from that portion now surrounding the article A and its associated tray T. This severing is effected by contact of the severing wire 141 with the film F. Displacement of the wire 141 results from energization of the solenoids 145 in response to closing of the switch 186 by operation of cam 187. The severing operation is illustrated in FIGURE 21 and the solenoids 145 will be subsequently deenergized permitting return of the wire 141 to its inoperative position. It will also be noted that although the film has been severed at this point, the film has not been left unsupported. At this point, the film F is supported along the longitudinal marginal edge portions at what is now the leading end of the film by the clamping means 50.

In the position shown in FIGURES 19 and 20, the ends of the film F forming the end flaps of the envelope surrounding the article A have been released by the clamping means 50 and although the film has been transversely stretched, the film will not immediately retract to its normal transverse dimension as the film has a certain time lag and the wiper bars 161 are holding the film against the lower edge of the clamping bar 131 and the heat-sealing element 134 as well as against the article. This is also true in FIGURE 21 where the film has been severed. Following the severing of the film F, the spreader fingers 151 are returned to their inoperative position by deenergization of the respective solenoids 154 and the clamping bar 131 is swung upwardly out of engagement with the film wrapping the article in response to operation of the cam 137 and the wiper bars 161 will be free to complete the end flap folding operation. This is shown in FIGURE 22 where the wrapping operation has progressed to approximately the 280° point. As will be seen in this figure, the wiper bars 161 have now been rotated upwardly over the bottom of the article completely folding the end flaps over the longitudinal portion of the wrap and heat sealing the overlapped portion of the film. FIG- URE 26 further illustrates the end folding operation. This will have been accomplished before the film will have had an opportunity to fully retract to its original transverse dimension and the film will remain substantially stretched in the transverse direction. The completed folding of the film F in forming a package wrap is illustrated in FIGURE 24. In the position shown in FIGURE 22, the article A is maintained in association with plate 106 by the clamping effect of the wiper bars 161.

This completes the wrapping operation and the article A and tray T, which are now fully wrapped, may be ejected or removed from the packaging apparatus. The removal is illustrate in FIGURE 23 where the rectangular plate 106 of the article-supporting table has been tilted forwardly and the end flap folding mechanisms 53 have been returned to their normal positions by energization of the solenoids 171. Forward tilting of the plate 106 is effected through operation of cam 121 and connecting arm 113. A reverse tilting from that of the position shown in FIGURE 15 results from the pivotal connection of the arm 113 being displaced to the opposite side of a line drawn between the hinge pin 108 and the connection of the arm 113 to the rocker arm 116. The article, which is now wrapped, is thus free and will fall from the table 51. In the illustrated embodiment of the apparatus, as shown in FIGURES 1, 2 and 3, the article will be deposited on a discharge conveyor 35 for transportation to a packaging station or distribution point.

The wrapping operation is completed at approximately 315° revolution of the drive shaft 99 and the clamping means 50 will have been rotated to the point indicated in FIGURE 23. This rotation of the drive shaft 99 will continue to return the clamping means to the position shown in FIGURE 14. Thus, the film F will be supported in an open V-shape to again receive the succeeding article to be wrapped. Also at this point, about 360° of revolution, the article-supporting table will have been returned to its initial position with the plate 106 horizontally disposed. As the drive shaft completes 360° of revolution, the cam 182 will have rotated to the point where the associated switch 181 will be opened and thereby interrupt the circuit to the electromagnetic clutch resulting in disengagement of the shaft 99 from the drive motor 96. Thus, the wrapping operation will be concluded and the various elements of the apparatus will be brought to a stop at the initial starting position. A second wrapping operation may be initiated by passage of a second article through the light beam from the light source 178 on its way to the receiving station of the packaging apparatus. A second wrapping operation will then proceed as has been described.

A single embodiment of a packaging apparatus embodying this invention has been illustrated and described herein in substantial detail. It it to be understood that the packaging apparatus may be constructed in varied sizes and proportions to accommodate specific ranges of article size for optimum performance although a particular machine is not limited to a specific size and shape of article.

It is readily apparent from the foregoing detailed description and drawings that this invention provides a novel packaging apparatus which is capable of utilizing a soft-film wrapping material and mechanically completing a wrapping operation. The apparatus includes elements which provide continuous support of the film during the wrapping operation whereby the several elements may successfully perform their respective operations on the film. In addition, the apparatus longitudinally and transversely stretches the film during the wrapping operation so that, at the conclusion of the wrapping operation, the film will be drawn tightly about the article.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A packaging apparatus for wrapping articles in a film of resiliently pliable material comprising clamping means adapted to releasably grip the film along opposed, longitudinal marginal edge portions and operable to form the film into an elongated, tubular envelope about the article and to stretch the film transversely to to the longitudinal marginal edge portions thereof, film folding means selectively engageable with the marginal end portions of the tubularly formed envelope and operable to fold said portions in overlapped, contacting engagement with the central portion of said tubular envelope upon release by said clamping means, and actuating means operatively coupled with said clamping means and film folding means for effecting operation thereof in relatively timed relationship to wrap an article.

2. A packaging apparatus according to claim 1 wherein said clamping means includes a pair of opposed clamping jaw assemblies disposed in axially aligned, spaced apart relationship for releasably engaging opposed, longitudinal marginal edge portions of the film, said clamping jaw assemblies being supported for rotation about an axis extending transversely relative to the longitudinal marginal edge portions of the film supported thereby and being axially displaceable along said axis in relatively opposite directions.

3. A packaging apparatus according to claim 2 wherein each of said clamping jaw assemblies include first and second film gripping sections which are sequentially operable during rotation of said clamping jaw assemblies to grip respective, longitudinally spaced marginal edge portions of the film.

4. A packaging apparatus according to claim 1 which includes an article supporting table selectively movable relative to said clamping means for support of the film and article between the opposed, longitudinal marginal edge portions of the film.

5. A packaging apparatus according to claim 1 wherein said film folding means includes bottom folding means operable to fold overlapping portions of the tubularly formed envelope of film into contacting engagement.

6. A packaging apparatus according to claim 5 wherein said bottom folding means includes film gripping means operable to releasably engage and support the film at opposed, longitudinal marginal edge portions trailing from the tubularly formed envelope of film for maintaining the trailing portion of the film in a relatively flat configuration to facilitate gripping of the film by said clamping means.

7. A packaging apparatus according to claim 1 which includes film severing means selectively movable into operative engagement with the film and operable to sever the film transversely.

8. A packaging apparatus according to claim 1 for use with a film of the sealable type which includes sealing means for generating heat to effect a seal between overlapped portions of the film in contacting engagement.

9. The method of wrapping an article in a film of resiliently pliable material consisting of releasably gripping the film along longitudinal, marginal edge portions and revolving the gripped portion of the film to form a tubular envelope surrounding the article, stretching the film transversely during the formation of the tubular envelope, releasing the marginal end portions of the tubular envelope, folding the released marginal end portions of the tubular envelope over a central portion of the tubular envelope and into contacting engagement therewith before the film has completely contracted, and sealing together the overlapped film portions which are in contacting engagement.

10. The method of wrapping an article according to claim 9 including the step of applying heat to overlapped portions of a heat sealable type film which are in contacting engagement to effect a seal therebetween.

11. The method of wrapping an article according to claim 9 including forming the tubular envelope with a peripheral dimension substantially less than that of the article to effect stretching of the film in a longitudinal direction.

No references cited.

TRAVIS S. McGEHEE, *Primary Examiner.*

R. L. SPRUILL, *Assistant Examiner.*